United States Patent
Nomura et al.

(10) Patent No.: US 7,574,517 B2
(45) Date of Patent: Aug. 11, 2009

(54) INFORMATION PROCESSING UNIT, METHOD, AND PROGRAM

(75) Inventors: Takashi Nomura, Tokyo (JP); Hiroyuki Tominaga, Kanagawa (JP); Haruhiko Sakata, Kanagawa (JP); Masayuki Takahashi, Tokyo (JP); Masayuki Ishikawa, Chiba (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 10/489,852

(22) PCT Filed: Jun. 25, 2003

(86) PCT No.: PCT/JP03/08026

§ 371 (c)(1),
(2), (4) Date: Apr. 2, 2004

(87) PCT Pub. No.: WO2004/012401

PCT Pub. Date: Feb. 5, 2004

(65) Prior Publication Data

US 2005/0021829 A1    Jan. 27, 2005

(30) Foreign Application Priority Data

Jul. 30, 2002    (JP)    ............... 2002-221129
Mar. 28, 2003    (JP)    ............... 2003-091291

(51) Int. Cl.
   *G06F 15/16*    (2006.01)
(52) U.S. Cl. ................. 709/233; 709/224
(58) Field of Classification Search ........ 709/232, 709/227, 228, 233, 223, 224
See application file for complete search history.

(56) References Cited

U.S. PATENT DOCUMENTS

| | | | | |
|---|---|---|---|---|
| 6,215,772 | B1* | 4/2001 | Verma | 370/236 |
| 6,266,346 | B1* | 7/2001 | Takeda et al. | 370/468 |
| 6,292,834 | B1* | 9/2001 | Ravi et al. | 709/233 |
| 6,438,603 | B1* | 8/2002 | Ogus | 709/233 |
| 6,587,875 | B1* | 7/2003 | Ogus | 709/223 |
| 6,701,372 | B2* | 3/2004 | Yano et al. | 709/232 |
| 6,996,067 | B1* | 2/2006 | Burke et al. | 370/248 |
| 7,043,560 | B2* | 5/2006 | Coulombe et al. | 709/232 |
| 2002/0194361 | A1* | 12/2002 | Itoh et al. | 709/233 |
| 2005/0033806 | A1* | 2/2005 | Harvey et al. | 709/204 |

FOREIGN PATENT DOCUMENTS

| | | |
|---|---|---|
| JP | 2000-115233 | 4/2000 |
| JP | 2000-224172 | 8/2000 |
| JP | 2002-33733 | 1/2002 |

* cited by examiner

*Primary Examiner*—David Lazaro
(74) *Attorney, Agent, or Firm*—Oblon, Spivak, McClelland, Maier & Neustadt, P.C.

(57) ABSTRACT

The present invention relates to an information processing apparatus and method, and to a program that ensure connection between devices connected to transmission paths of various transmission speeds. A media IM client #1 logs in to a media IM server 14 and executes a speed measurement process with a measurement server 200 to determine its uplink speed and downlink speed. A media IM client #2 at the other communication party also logs in to the media IM server 14 and executes a speed measurement process with the measurement server 200 to determine its uplink speed and downlink speed. The media IM clients #1 and #2 exchange the determined speeds via the media IM server 14, setting a set speed, and communicate with each other at the set speed. The present invention is applicable to a personal computer, a network-enabled CE device, and a commercial application server on the Internet.

5 Claims, 26 Drawing Sheets

FIG. 8

- PROFILE SPACE ID = 10000001
- PARAMETERS
  - access method, bit rate, X scale, Y scale, audio codec
  - access method {1:RTSP/TCP+RTP/UDP, 2:HTTP tunneling}
  - bit rate {6k~512kbps}
  - X scale {128~352}
  - Y scale {96~288}
  - Video Codec {1:MPEG4}
  - audio codec {0:none, 1:CELP 8k, 2:CELP 16k, 3:AAC 16k, 4:AAC 32k, 5:AAC 44.1k, 6:AAC 48k}

FIG. 9

- PROFILE DESCRIPTION
  - PROFILE SPACE ID= 10000001
  - access method {1:RTSP/TCP+RTP/UDP, 2:HTTP tunneling}
  - bit rate {6k~128kbps}
  - X scale {160}
  - Y scale {120}
  - audio codec {0:none, 1:CELP 8k}

FIG. 10

- DESCRIPTION OF PROFILE ATOM
  - PROFILE SPACE ID= 10000001
  - access method {2:HTTP tunneling}
  - bit rate {48kbps}
  - X scale {160}
  - Y scale {120}
  - audio codec {1:CELP 8k}

INFORMATION PROCESSING UNIT, METHOD, AND PROGRAM

TECHNICAL FIELD

The present invention relates to an information processing apparatus and method, and to a program. In particular, the present invention relates to an information processing apparatus and method, and to a program that ensure connection between devices connected to transmission paths of different transmission speeds.

BACKGROUND ART

With the recent popularity of the Internet, the number of users who exchange various data with other users over the Internet has increased.

However, for example, when a user is to transmit a certain image to the device of another user, traditionally, the image data cannot be transmitted in a stable manner due to the difference between the transmission speed of the transmission path to which the device of the other user is connected and the transmission speed of the transmission path to which the device of the user is connected.

An approach in which a data transmission device detects network congestion from the delayed arrival of packets to control the data transmission rate based on the detection has been proposed (see, for example, Japanese Unexamined Patent Application Publication No. 11-308271).

However, the approach described in Japanese Unexamined Patent Application Publication No. 11-308271 suffers from the problem that the actual data speed cannot be determined until data transmission and reception start.

DISCLOSURE OF INVENTION

The present invention has been made in view of such a situation, and is intended to ensure that a user is quickly and reliably connected to the device of the other party without placing a burden on the user, irrespectively of the state of the transmission paths, so as to improve the usability.

An information processing apparatus of the present invention includes login means for logging in to a second other information processing apparatus, measurement means for measuring the transmission speed of a transmission path including a network before or after the login means logs in, notification means for notifying a first other information processing apparatus of the transmission speed measured by the measurement means via the second other information processing apparatus, and communication means for communicating with the first other information processing apparatus at a transmission speed set based on the transmission speed measured by the measurement means.

The information processing apparatus may further include receiving means for receiving a transmission speed measured by the first other information processing apparatus via the second other information processing apparatus, and setting means for setting the transmission speed at which the information processing apparatus communicates with the first other information processing apparatus based on the transmission speed received by the receiving means and the transmission speed measured by the measurement means.

The measurement means may measure the transmission speed using a measurement server connected to the network.

An information processing method of the present invention includes a login step of logging in to a second other information processing apparatus, a measurement step of measuring the transmission speed of a transmission path including a network before or after login performed in the login step, a notification step of notifying a first other information processing apparatus of the transmission speed measured in the measurement step via the second other information processing apparatus, and a communication step of communicating with the first other information processing apparatus at a transmission speed set based on the transmission speed measured in the measurement step.

A program of the present invention causes a computer to execute a login step of logging in to a second other information processing apparatus, a measurement step of measuring the transmission speed of a transmission path including a network before or after login performed in the login step, a notification step of notifying a first other information processing apparatus of the transmission speed measured in the measurement step via the second other information processing apparatus, and a communication step of communicating with the first other information processing apparatus at a transmission speed set based on the transmission speed measured in the measurement step.

In the information processing apparatus and method, and program of the present invention, login to a second other information processing apparatus is performed, the transmission speed of a transmission path including a network is measured before or after login, a first other information processing apparatus is notified of the measured transmission speed via the second other information processing apparatus, and communication with the first other information processing apparatus is performed at a transmission speed set based on the measured transmission speed.

BRIEF DESCRIPTION OF THE DRAWINGS

FIG. 8 is a view showing an example profile space.

FIG. 9 is a view showing an example profile description.

FIG. 10 is a view showing an example profile atom.

BEST MODE FOR CARRYING OUT THE INVENTION

Figure 1:
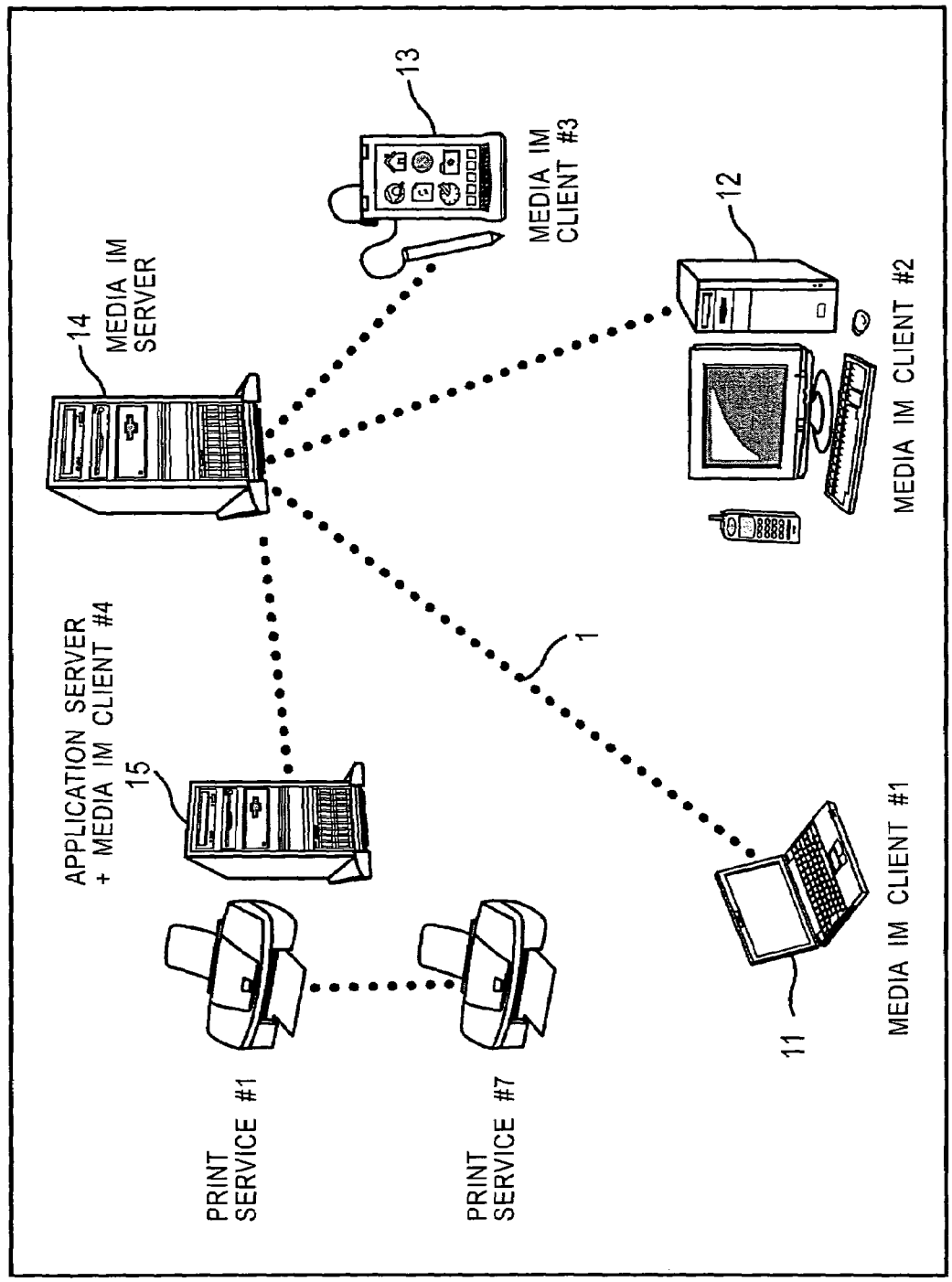
FIG. 1 is a diagram showing an example structure of a network system according to the present invention.

FIG. 1 shows an example structure of a network system according to the present invention. In this network system, personal computers 11 and 12 and a PDA (Personal Digital Assistants) 13, are connected as user terminals to a media instant message server (media IM server) 14 via the Internet 1. An application server 15 is also connected to the media IM server 14 via the Internet 1.

In the personal computer 11, a media IM client #1 is implemented as middleware. In the personal computer 12, a media IM client #2 are implemented as middleware. In the PDA 13, likewise, a media IM client #3 is implemented as middleware.

In the application server 15, a media IM client #4 is implemented as middleware. The application server 15 provides print services 1 through 7 to users that access the application server 15.

The media IM server 14 controls instant messaging among the media IM clients #1 through #4.

Figure 2:
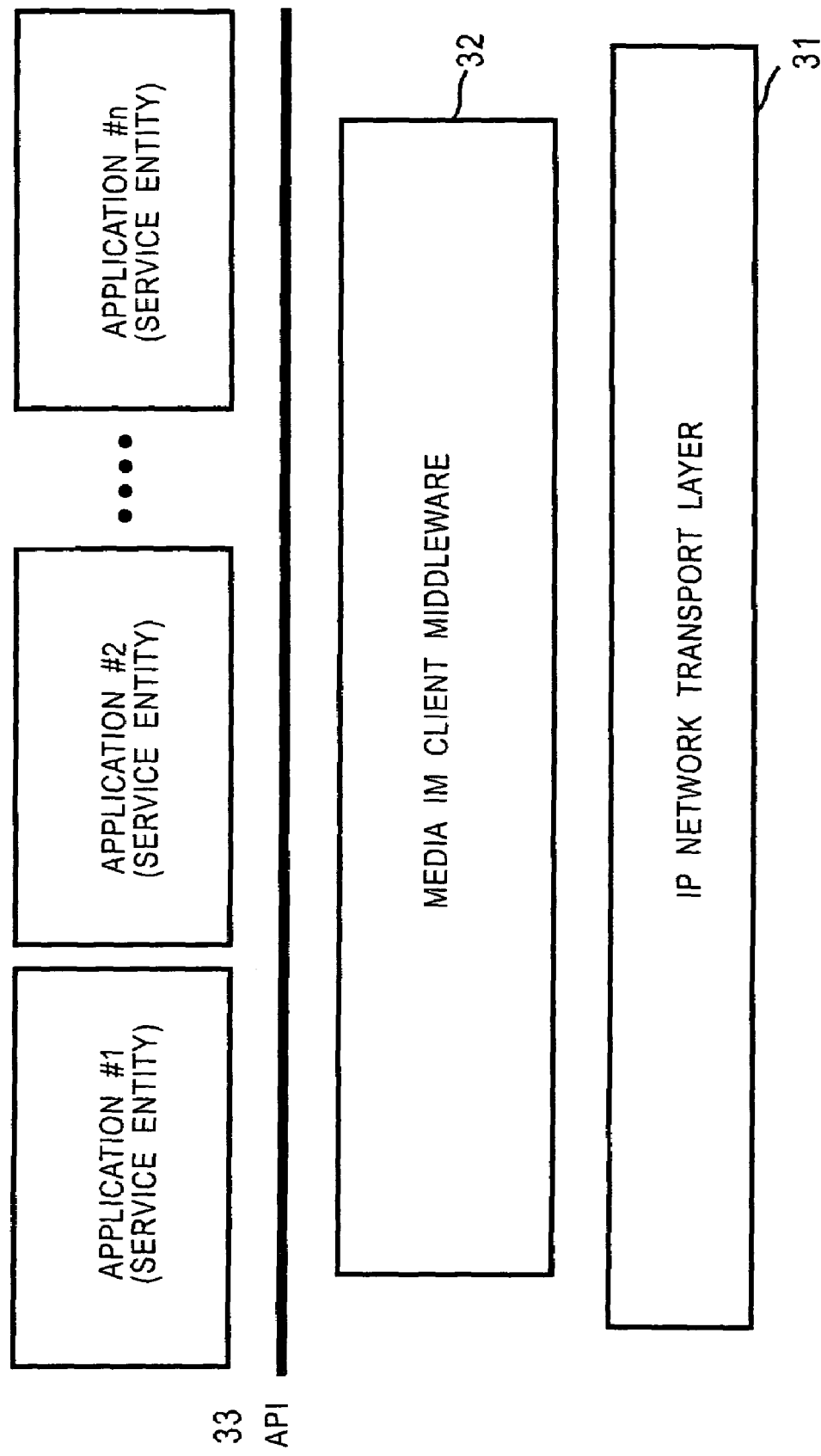
FIG. 2 is a diagram showing software layers.

FIG. 2 shows software configuration. In FIG. 2, the media IM clients #1 through #4 are shown as media IM client middleware 32. The media IM client middleware 32 is located between an IP network transport layer 31 and an API (Application Program Interface) 33. The API 33 interfaces between applications #1 through #N and the media IM client middleware 32. The media IM client middleware 32 interfaces goto between the API 33 and the IP network transport layer 31.

Each of the applications #1 through #N constitutes a service entity.

Figure 3:
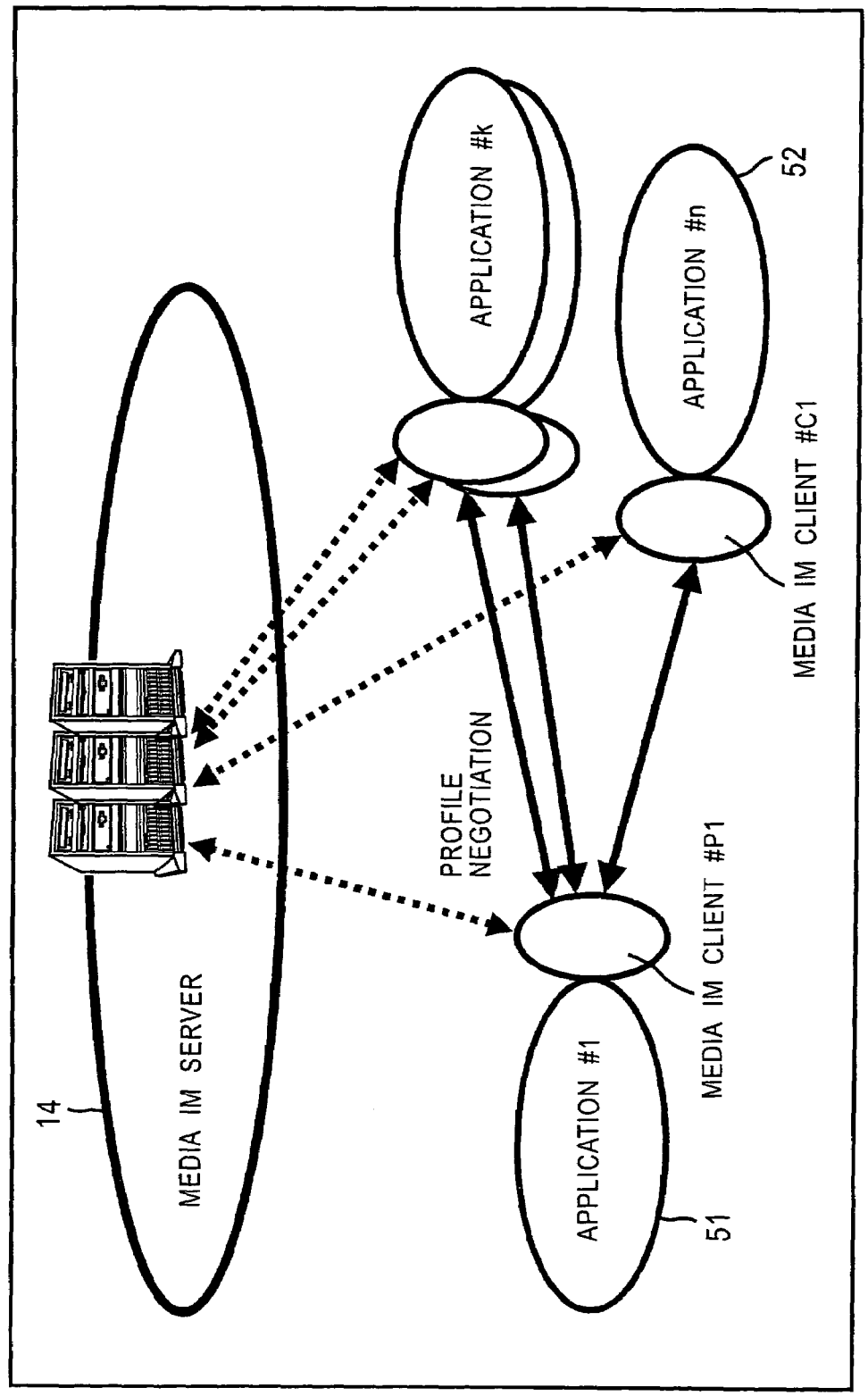
FIG. 3 is a diagram showing the overview operation of the network system according to the present invention.

In the network system, as shown in FIG. 3, the application of the entity that provides a service (in the example shown in FIG. 3, the application #1) serves as a service provider 51, and the application of the entity that receives the service (in the example shown in FIG. 3, the application #n) (the entity that consumes the service) serves as a service consumer 52.

The service provider 51 and the service consumer 52 perform negotiation for connection via the corresponding media IM client #P1 and media IM client #C1 using the presence function, messaging function, or Info/Query function of instant messaging. After mutual connection is confirmed by negotiation, the service provider 51 and the service consumer 52 perform peer-to-peer (P2P) connection.

Each of the service provider 51 and the service consumer 52 constitutes a service entity. The service entity itself may be an application, or a set of service entities may constitute a single application. In the following description, for simplicity, a single service entity corresponds to a single application.

The details of the connection process will now be described with reference to the flowcharts shown in FIGS. 4 through 7.

In step S1, the application #1 serving as the service provider 51 instructs the media IM client #P1 to announce a profile space ID indicating the type of a service that it can provide to buddies registered in a roster. Upon receiving the instruction in step S2, then in step S3, the media IM client #P1 notifies the buddies registered in the roster of the profile space ID using presence.

Profile space IDs and application IDs are registered in advance and managed by an application platform administrator. The service consumer 52 is able to specify the content based on such IDs.

FIG. 8 shows an example profile space for defining an MPEG-4 streaming server application that runs on the personal computer 11. As shown in FIG. 8, the profile space is formed of a profile space ID and parameters. In this example, the profile space ID is "10000001." The parameters include "access method," "bit rate," "X scale," "Y scale," and "audio codec." In this example, the value of the access method is 1 (RTSP/TCP+RTP/UDP) or 2 (HTTP tunneling). The bit rate is 6 to 512 kbps. The X scale is 128 to 352, and the Y scale is 96 to 288.

The video codec is MPEG-4. The audio codec is any of none, CELP (Code Excited Linear Predictive) 8 k, CELP 16 k, AAC (Advanced Audio Coding) 16 k, AAC 32 k, AAC 44.1 k, and AAC 48 k.

In this manner, all the parameters are represented by numeric values.

Referring back to FIG. 4, upon receiving the announcement from the media IM client #P1 in step S4, then in step S5, the media IM server 14 announces it to the buddies in the roster.

The media IM client #C1, which is one of the announced buddies (the service consumer 52), upon receiving the notification in step S6, determines (verifies) in step S7, based on the profile space ID and the application ID of the service provider 51 (in this example, the ID of the application #1), whether or not this profile is acceptable for the media IM client #C1. This determination is possible since, as described above, each participant in the system is allowed to identify the profile content based on these IDs.

A table describing the correspondence between these IDs and the content may be stored in each device (the personal computer 11 or 12, or the like), or may be stored in a predetermined server (for example, the media IM server 14). In this case, it is possible to bill a user each time the user uses the table. This is beneficial to the administrator of the media IM server 14.

If the media IM client #C1 determines that the content of the profile for which the presence has been received from the service provider 51 is acceptable for the service consumer, then in step S8, the media IM client #C1 announces the content of the presence (profile) to the application #n serving as the service consumer 52 for which it is acceptable. In step S9, the application #n receives the announcement from the media IM client #C1.

If each media IM client determines, as a result of verification, that there is no appropriate application serving as a service consumer, the media IM client ignores the received announcement.

Upon receiving the content of the presence of the service provider 51, then in step S10, the application #n serving as the service consumer 52 instructs the media IM client #C1 to obtain detailed information of the service provided from the service provider 51. Upon receiving the instruction in step S1, then in step S12, the media IM client #C1 uses the messaging function or Info/Query function to request transmission of the provider profile of the service provided by the service provider 51. This request includes address information for specifying the service provider 51.

Upon receiving the request from the media IM client #C1 in step S13, then in step S14, the media IM server 14 sends the request to the media IM client #P1. Upon receiving the request from the media IM server 14 in step S15, then in step S16, the media IM client #P1 supplies the request to the application #1 serving as the service provider 51.

Upon receiving the request from the media IM client #P1 in step S17, then in step S18, the application #1 configures a provider profile that is to be provided to the service consumer 52, and sends the profile to the media IM client #P1.

The content of the provider profile generated by the application #1 includes specific setting of the ranges of values of parameters, of the parameter group defined in the profile space (FIG. 8), that the service provider 51 can actually provide to the service consumer 52 with consideration of the runtime environments such as the network link speed and the CPU load state.

FIG. 9 shows an example provider profile generated in the manner described above. In FIG. 9, the provider profile is represented as a profile description.

FIG. 9 shows an example in which the application #1 serving as the service provider 51 only supports the viewing angle for VGA (Video Graphics Array) (160×120 or 320×240), and is connected to a network equivalent to a PHS (Personal Handyphone System) (a network with a maximum link speed of 128 kbps). In the example shown in FIG. 9, therefore, in view of the network link speed, the viewing angle is limited only to 160×120 (X scale×Y scale) of the range defined in the profile space shown in FIG. 8.

In the example shown in FIG. 9, furthermore, the profile space ID is "10000001," and the access method is either RTSP/TCP+RTP/UDP or HTTP tunneling. The bit rate is 6 to 128 kbps. The audio codec is none or CELP 8 k.

Upon receiving the reply, i.e., the provider profile, from the application #1 in step S19, then in step S20, the media IM client #P1 returns the reply to the application #n using the messaging function or the Info/Query function.

Upon receiving the reply from the media IM client #P1 in step S21, then in step S22, the media IM server 14 sends the reply to the media IM client #C1. Upon receiving the reply in step S23, then in step S24, the media IM client #C1 sends the reply to the application #n. In step S25, the application #n receives the reply from the service provider 51.

The application #n matches (compares) the provider profile of the service provider 51 received in step S25 with a consumer profile generated by the application #n.

As described above, the provider file (profile description) presented by the service provider is represented by numeric values only. Thus, the service consumer 52 can readily verify matching simply by one-dimensional comparison with the ranges of values of parameters that constitute its own profile.

If a match is found, then in step S26, the application #n requests the service provider 51 to register itself (i.e., the service consumer 52) to the service provided. Upon receiving the instruction from the application #n in step S27, then in step S28, the media IM client #C1 requests the service provider 51 to register to the service using the messaging function or the Info/Query function. This request includes the profile space ID and the application ID.

Upon receiving the request from the media IM client #C1 in step S29, then in step S30, the media IM server 14 sends the request to the media IM client #P1. Upon receiving the request from the media IM server 14 in step S31, then in step S32, the media IM client #P1 sends the request to the application #1. In step S33, the application #1 receives the registration request from the service consumer 52.

The application #1 serving as the service provider 51 registers the service consumer 52 in association with the service provided in step S18 to the service consumer 52. More specifically, the application ID of the application #n of the service consumer 52 is registered in association with the profile space ID.

In step S34, the application #1 instructs the media IM client #P1 to reply to the registration request. Upon receiving this instruction in step S35, then in step S36, the media IM client #P1 announces a registration result using the messaging function or the Info/Query function. Upon receiving the announcement of the registration result in step S37, then in step S38, the media IM server 14 sends the announcement to the media IM client #C1. Upon receiving the announcement in step S39, then in step S40, the media IM client #C1 sends the announcement to the application #n. In step S41, the application #n receives the announcement of the registration result.

In step S42, the application #n determines, as a profile atom, the parameters for ensuring connectivity based on the profile description from the service provider 51. That is, the parameters that allow the application #1 to use the data sent by the application #n without change (the parameters acceptable for the application #1) are determined.

FIG. 10 shows an example of this profile atom (the description of the profile atom). In this example, the profile space ID is "10000001," and the access method is HTTP tunneling. That is, the access method numbered 2 shown in FIG. 9 is selected.

The bit rate is 48 kbps, the X scale is 160, and the Y scale is 120. The audio codec is CELP 8 k.

In step S42, the application #n issues a connection request including the thus determined profile atom. Upon receiving the request in step S43, then in step S44, the media IM client #C1 sends the request to the service provider 51 using the messaging function or the Info/Query function. Upon receiving the request in step S45, then in step S46, the media IM server 14 sends the request to the media IM client #P1. Upon receiving the request from the media IM server 14 in step S47, then in step S48, the media IM client #P1 sends the request to the application #1. In step S49, the application #1 receives the request.

Upon receiving the request, the application #1 sends a reply including connection information necessary for the service consumer 52 (i.e., the application #n) to connect to the service provider 51 (i.e., the application #1) to the service consumer 52 in step S50. The connection information may be, for example, a URI (Uniform Resource Identifier).

The reply sent from the application #1 in step S50 is received by the media IM client #P1 in step S51. In step S52, the media IM client #P1 sends the reply to the service consumer 52 using the messaging function or the Info/Query function. Upon receiving the reply from the media IM client #P1 in step S53, then in step S54, the media IM server 14 sends the reply to the media IM client #C1. Upon receiving the reply from the media IM server 14 in step S55, then in step S56, the media IM client #C1 sends the reply to the application #n. In step S57, the application #n receives the reply.

The application #1 waits for direct access (not via the media IM server 14) from the application #n after instructing transmission of the reply in step S50. In step S58, the application #n accesses the service URL (Uniform Resource Locator) of the application #1 in peer-to-peer fashion not via the media IM server 14. In step S59, the application #1 receives the peer-to-peer access to the URL from the application #n.

Thereafter, the application #1 and the application #n are able to exchange information in peer-to-peer fashion.

As described above, the application platform of the present invention provides implementation of a new protocol architecture that allows negotiation of profiles at the application level based on the presence function, messaging function, and Info/Query function of instant messaging. With the use of such a match-making mechanism of the application platform, therefore, applications installed in various devices having different (or the same, of course) capabilities, such as a personal computer and a mobile device, are able to readily and reliably connect to each other. Thus, a system capable of transmitting rich media information, including various information such as text, audio, music, moving pictures, and still images, by peer-to-peer communication can be realized. In this case, applications (service entities) for which connectivity is finally authorized are allowed to communicate with each other in peer-to-peer fashion. Therefore, users are able to readily and reliably exchange information without any special operation.

The above-described applications (service entities) are not limited to personal computers or network-enabled CE (Consumer Electronics) equipment, and may be commercial application servers on the Internet 1.

For example, in the application server 15 shown in FIG. 1, an application for a commercial print service runs on the media IM client #4, as a service provider. The personal computer 11 or 12 or the PDA 13 shown in FIG. 1 is allowed to use via the Internet 1 the print service provided by the application server 15 by executing the above-described procedure with the application server 15.

Figure 11:
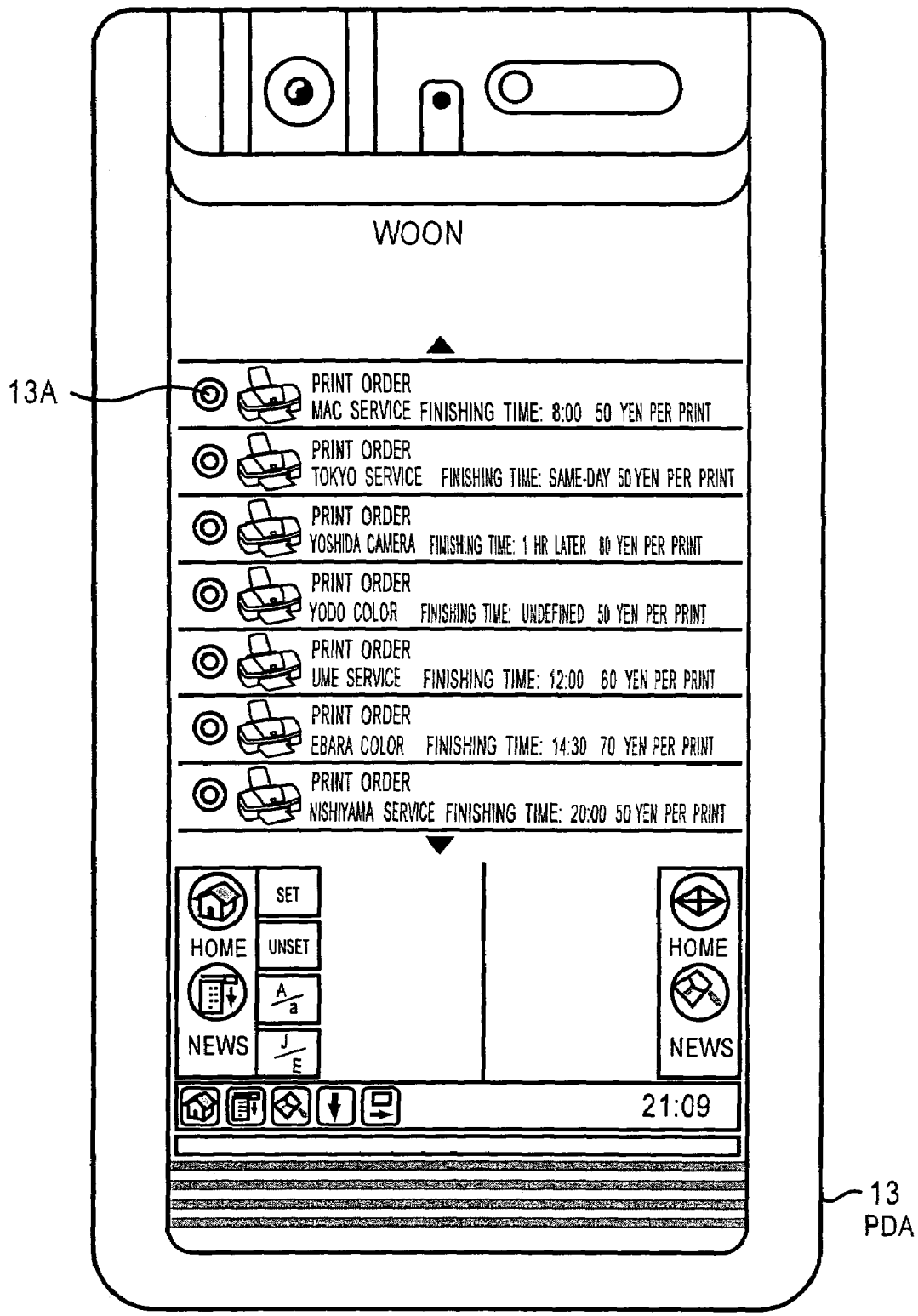
FIG. 11 is an illustration of an example display of a list of service providers.

In the present invention, therefore, services provided by servers connected to the Internet 1 are searched, thus allowing a list of service providers to be displayed as a buddy list shown in, for example, FIG. 11.

The example shown in FIG. 11 shows a list of service providers that can be used by a print service application running as a service consumer on the media IM client #3 installed in the PDA 13. In this case, the presence function can be used to flexibly express the status of commercial services in detail for each service consumer. For example, in the example shown in FIG. 11, a lamp icon 13A indicates whether or not a commercial service is in operation. In this case, for example, a commercial service in operation is indicated by green, and a commercial service out of operation is indicated by red. In the example shown in FIG. 11, the detail status, such as the finishing time of a requested print and the price, is also shown as status information.

As is apparent, also between applications of a service provider and a service consumer on user terminals, the status can be displayed in detail using a user interface and the presence function on an application basis depending upon the other party.

Figure 12:
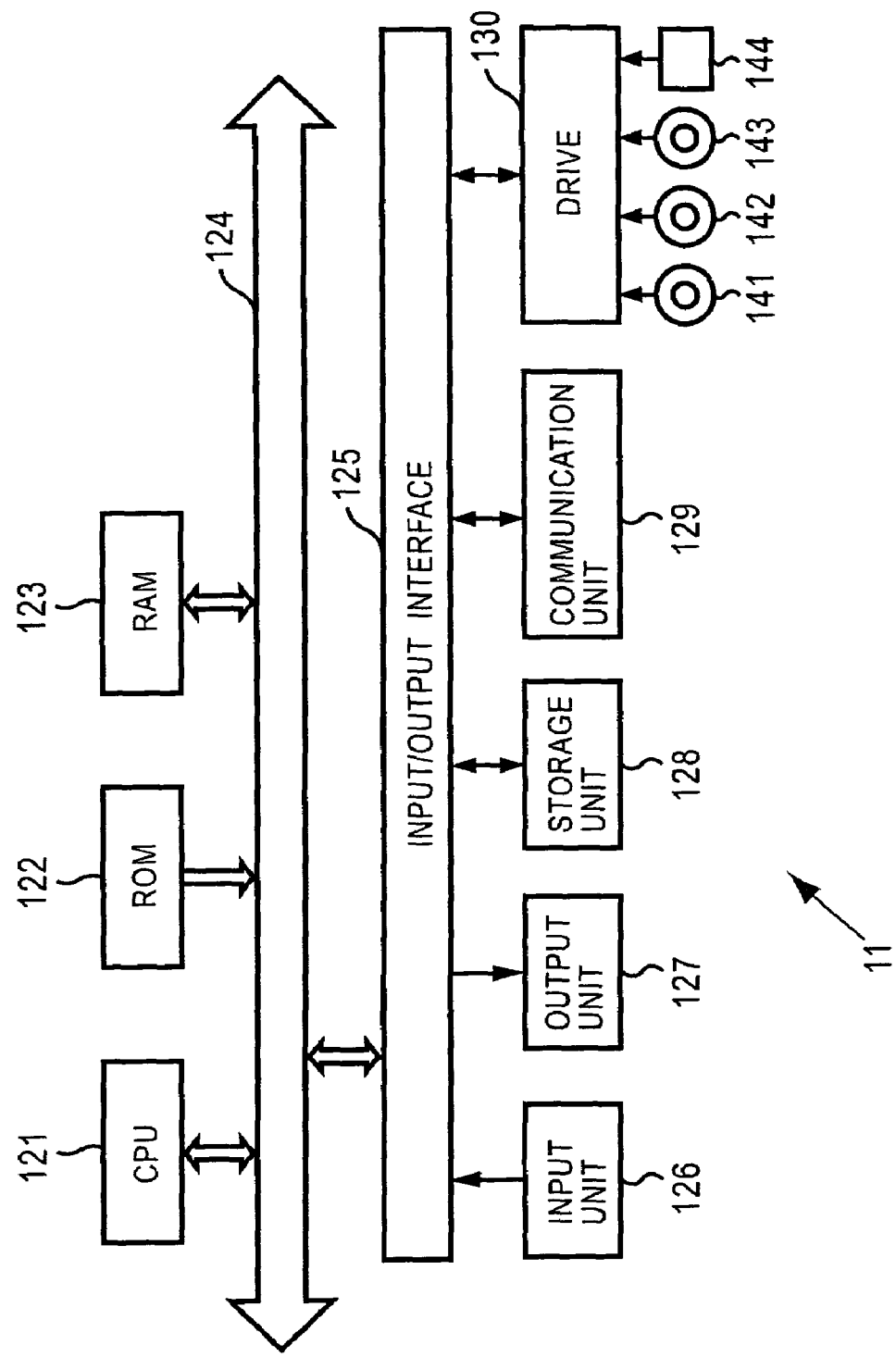
FIG. 12 is a block diagram showing an example configuration of a personal computer.

FIG. 12 shows an example configuration of the personal computer 11. Although not shown, the other personal computer 12 is configured in a similar manner. Thus, the configuration shown in FIG. 12 is also employed, as appropriate, as the configuration of the personal computer 12.

In FIG. 12, a CPU (Central Processing Unit) 121 executes various processes according to programs stored in a ROM (Read Only Memory) 122 or programs loaded from a storage unit 128 to a RAM (Random Access Memory) 123. The RAM 123 also stores data necessary for the CPU 121 to perform various processes, when required.

The CPU 121, the ROM 122, and the RAM 123 are connected with each other via a bus 124. The bus 124 is also connected with an input/output interface 125.

The input/output interface 125 is connected with an input unit 126, including a keyboard, a mouse, and so on, an output unit 127, including a display such as a CRT (Cathode Ray Tube) or an LCD (Liquid Crystal display), a speaker, and so on, the storage unit 128 formed of a hard disk etc., and a communication unit 129 formed of a modem, a terminal adapter, and so forth. The communication unit 129 performs communication via a network including the Internet.

The input/output interface 125 is also connected with a drive 130, if necessary, to which a magnetic disk 141, an optical disk 142, a magneto-optical disk 143, a semiconductor memory 144, or the like is mounted, as desired, and a computer program read therefrom is installed on the storage unit 128, if necessary.

The application #1 (i.e., the service provider 51) or the application #n (i.e., the service consumer 52) is loaded by the CPU 121 to the RAM 123, and is then executed.

In the foregoing description, there is no particular mention of how each service (the service provider 51 or the service consumer 52) sets a link speed. Generally, a user manually sets an appropriate link speed depending upon the service (e.g., a television telephone service, such as "With You Call (trademark)" provided by the present applicant/assignee).

However, it is difficult for a user to know information about an access line (link), particularly its bottleneck speed, and it is not necessarily easy for a user to manually set the link speed because, in an environment where a plurality of access lines must be used properly, switching of the access lines is bothersome.

Accordingly, in the present invention, each device (each media client) determines the link speed in accordance with the following procedure.

Figure 13:
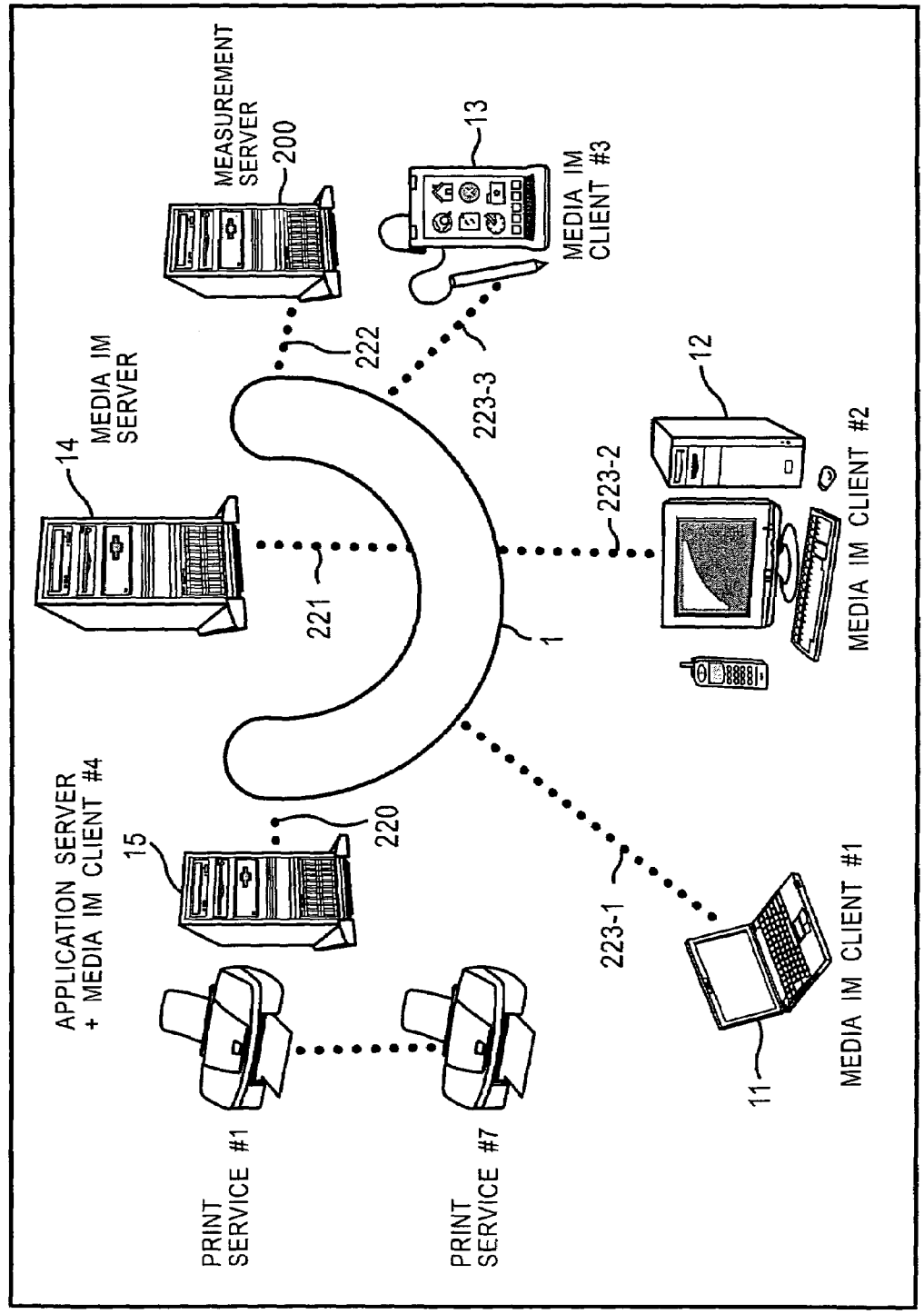
FIG. 13 is a diagram showing an example structure of a network system according to the present invention.

FIG. 13 shows an example structure of a network system having such an additional function.

In FIG. 13, in addition to the personal computers 11 and 12, the PDA 13, the media IM server 14, and the application server 15, a measurement server 200 is also connected to a network, i.e., the Internet 1.

The media IM server 14 is connected to the Internet 1 via a main link 221, and the measurement server 200 is connected to the Internet 1 via a main link 222. The personal computer 11 is connected to the Internet 1 via an access link 223-1, and the personal computer 12 is connected to the Internet 1 via an access link 223-2. The PDA 13 is connected to the Internet 1 via an access link 223-3, and the application server 15 is connected to the Internet 1 via a main link 220.

Each of the access links 223-1 through 223-3 is ISDN (Integrated Service Digital Network), ADSL (Asymmetric Digital Subscriber Line), or the like.

The measurement server 200 connected to the Internet 1 via the main link 222 is a server for measuring the link speed (transmission rate) of the access links 223-1 through 223-3 corresponding to the personal computers 11 and 12 and the PDA 13, respectively.

Other configuration is the same as that shown in FIG. 1, and a description thereof is thus omitted.

The details of the connection process will now be described with reference to FIGS. 14 through 17.

Figure 4:
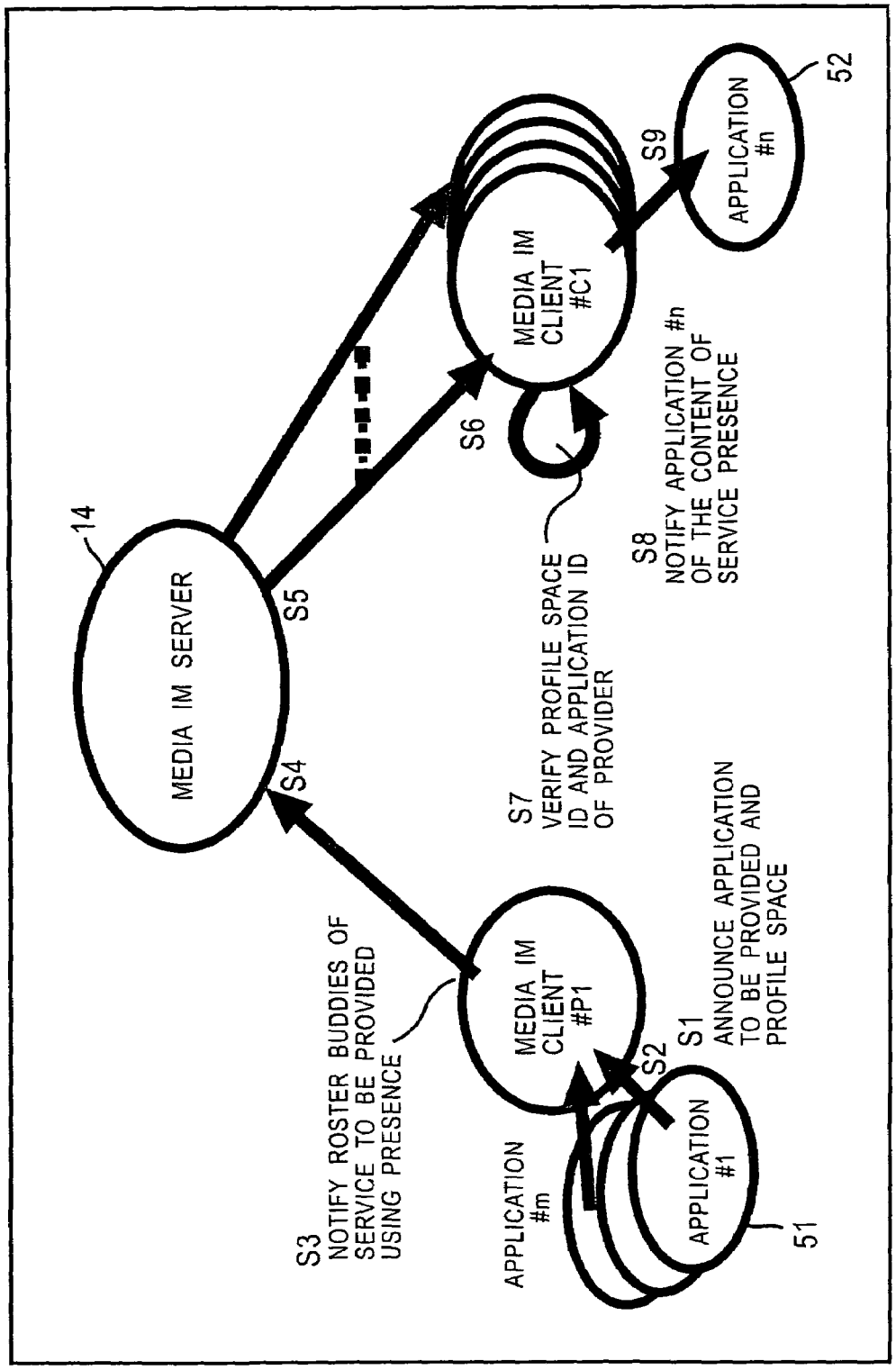
FIG. 4 is a flowchart showing the operation of the network system shown in FIG. 1.

In this case, prior to the above-described process shown in FIG. 4, each of the media IM client #P1 and the media IM client #C1 logs in to the media IM server 14, and communicates with the measurement server 200 to perform a speed measurement process (a process to determine its transmission speed).

The login processing and speed measurement processing by the media IM client #P1 will first be described with reference to the flowchart shown in FIG. 14.

In step S101, the media IM client #P1 logs in to the media IM server 14 (for example, it sends a login report). Upon receiving the login report from the media IM client #P1 in step S102, the media IM server 14 accepts the report, and, in step S103, sends a login completion report that indicates completion of login to the media IM client #P1.

Upon receiving the login completion report from the media IM server 14 in step S104, then in step S105, the media IM client #P1 executes a speed measurement process with the measurement server 200. In association with the processing by the media IM client #P1, in step S106, the measurement server 200 executes a speed measurement process with the media IM client #P1. The speed measurement process allows the media IM client #P1 to obtain its uplink and downlink speeds (uplink and downlink speeds of the bottleneck link). The uplink speed represents the speed (bit rate) at which the media IM client #P1 sends information to a certain terminal, and the downlink speed represents the speed (bit rate) at which the media IM client #P1 receives information. The details of the speed measurement process are described below with reference to FIGS. 23 through 26.

The login and speed measurement processing by the media IM client #C1 will now be described with reference to the flowchart shown in FIG. 15. Like the process shown in FIG. 14, this process is executed prior to the process shown in FIG. 4.

In step S151, the media IM client #C1 logs in to the media IM server 14 (for example, it sends a login report). Upon receiving the login report from the media IM client #C1 in step S152, the media IM server 14 accepts the report, and, in step S153, sends a login completion report that indicates completion of login to the media IM client #C1.

Upon receiving the login completion report from the media IM server 14 in step S154, then in step S155, the media IM client #C1 executes a speed measurement process with the measurement server 200. In association with the processing of step S155 by the media IM client #C1, in step S156, the measurement server 200 executes a speed measurement process with the media IM client #C1. The speed measurement process allows the media IM client #C1 to obtain its uplink and downlink speeds (uplink and downlink speeds of the bottleneck link). The uplink speed represents the speed at which the media IM client #C1 sends information to a certain terminal, and the downlink speed represents the speed at which the media IM client #C1 receives information.

In this way, each of the media IM client #P1 and the media IM client #C1 logs in to the media IM server 14, and then obtains its uplink and downlink speeds.

Figure 14:
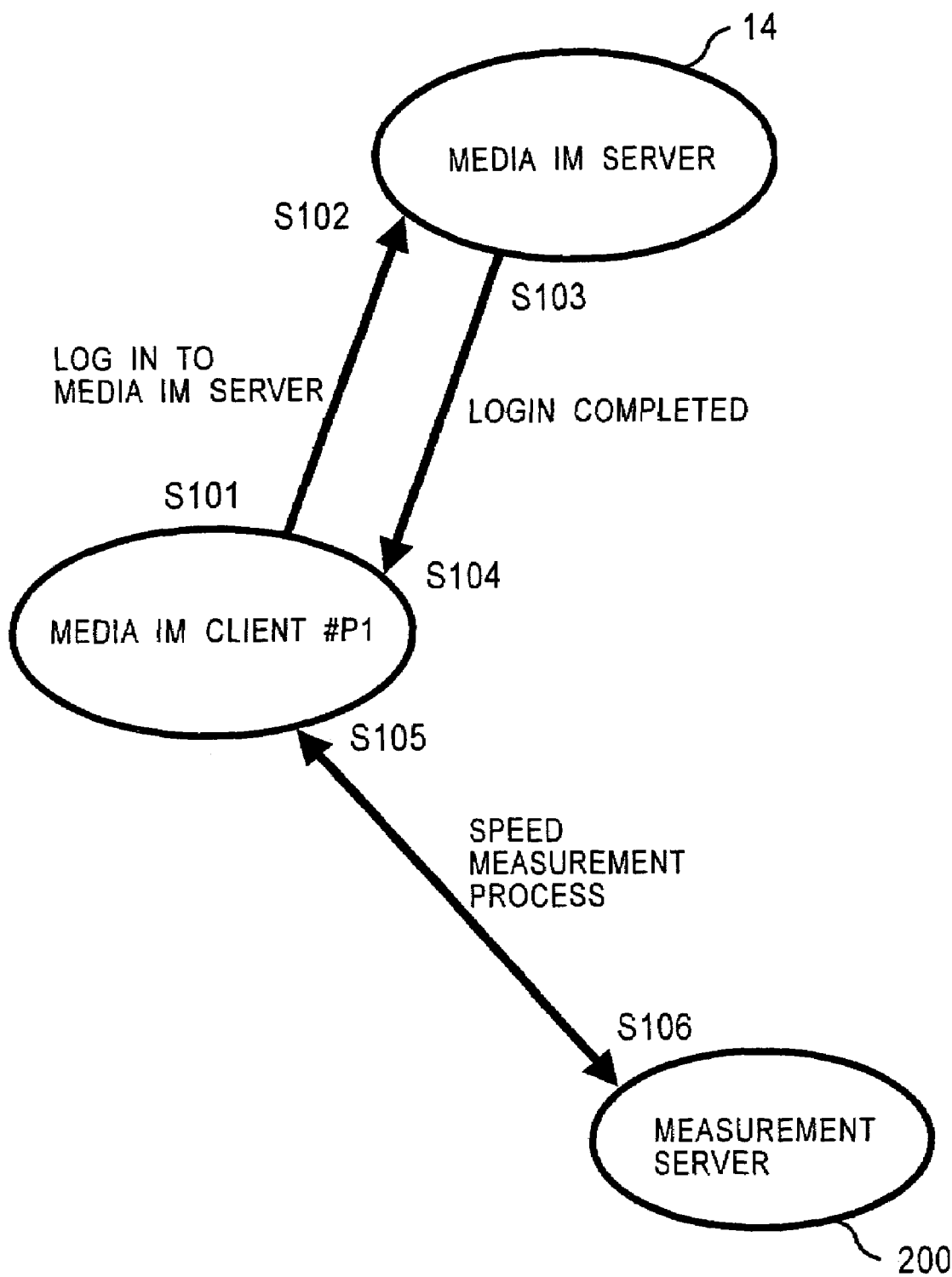
FIG. 14 is a flowchart showing the operation of the network system shown in FIG. 13.
Figure 15:
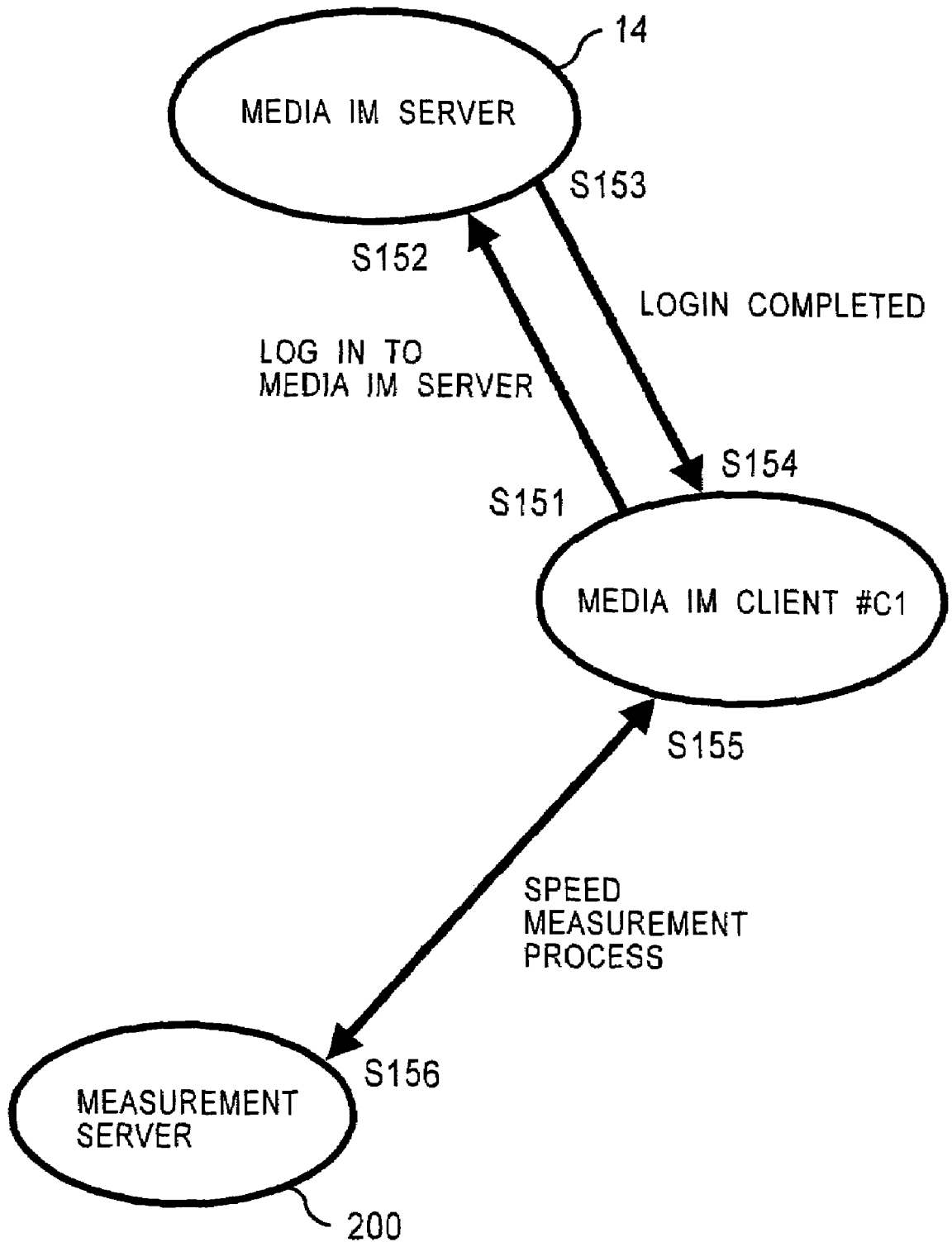
FIG. 15 is a flowchart showing the operation of the network system shown in FIG. 13.

In this embodiment, after the processing shown in FIGS. 14 and 15, the processing of steps S1 through S9 shown in FIG. 4 is executed. Thus, the service provider 51 (i.e., the application #1) announces a profile space ID indicating the type of a service that is can provide to buddies registered in a roster, and the media IM client #C1, which is one of the announced buddies (the service consumer 52), determines (verifies) whether or not this profile is acceptable for the media IM client #C1. The service consumer 52 (i.e., the application #n) for which it is acceptable is notified of the content of the presence (profile).

Figure 5:
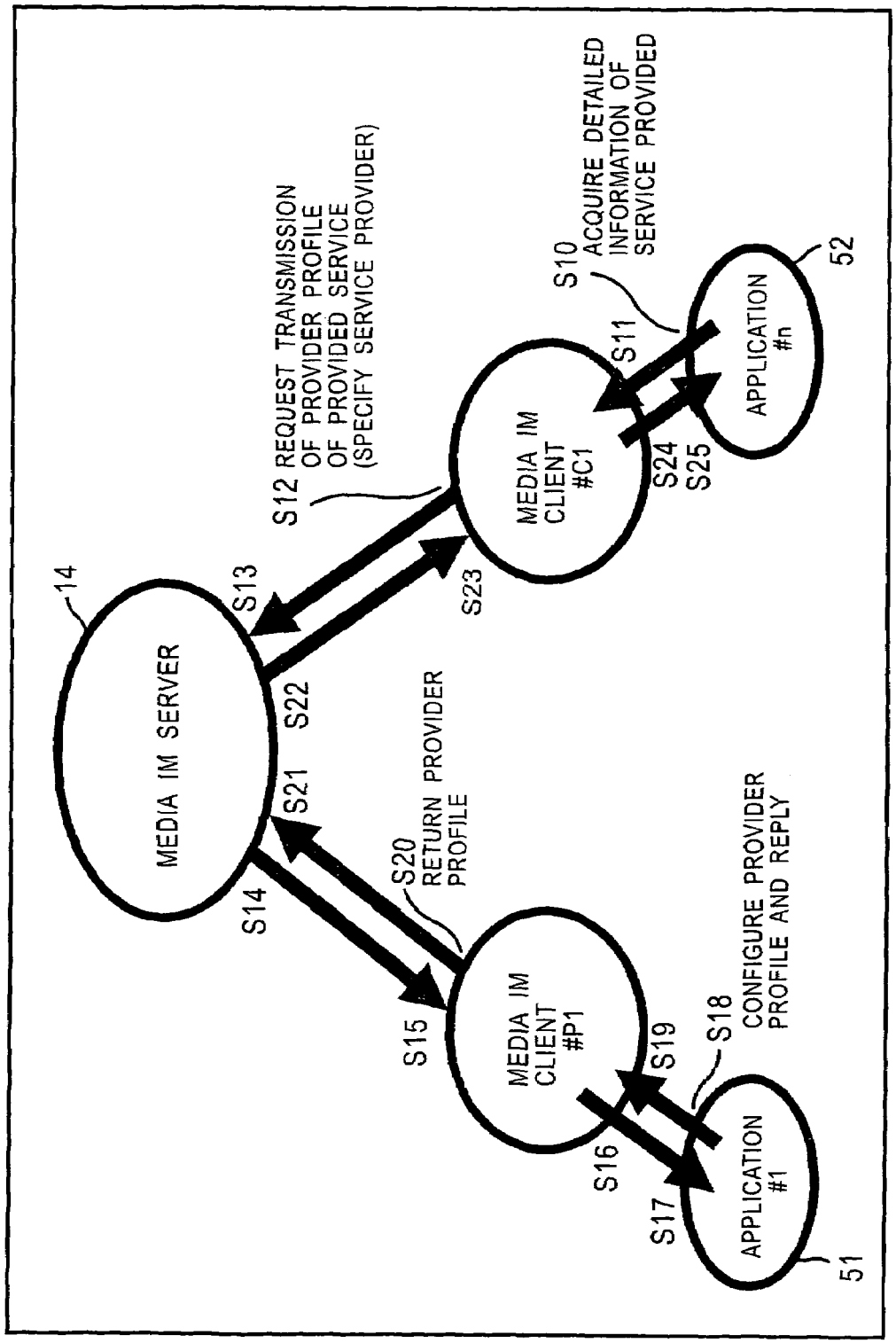
FIG. 5 is a flowchart showing the operation of the network system shown in FIG. 1.
Figure 16:
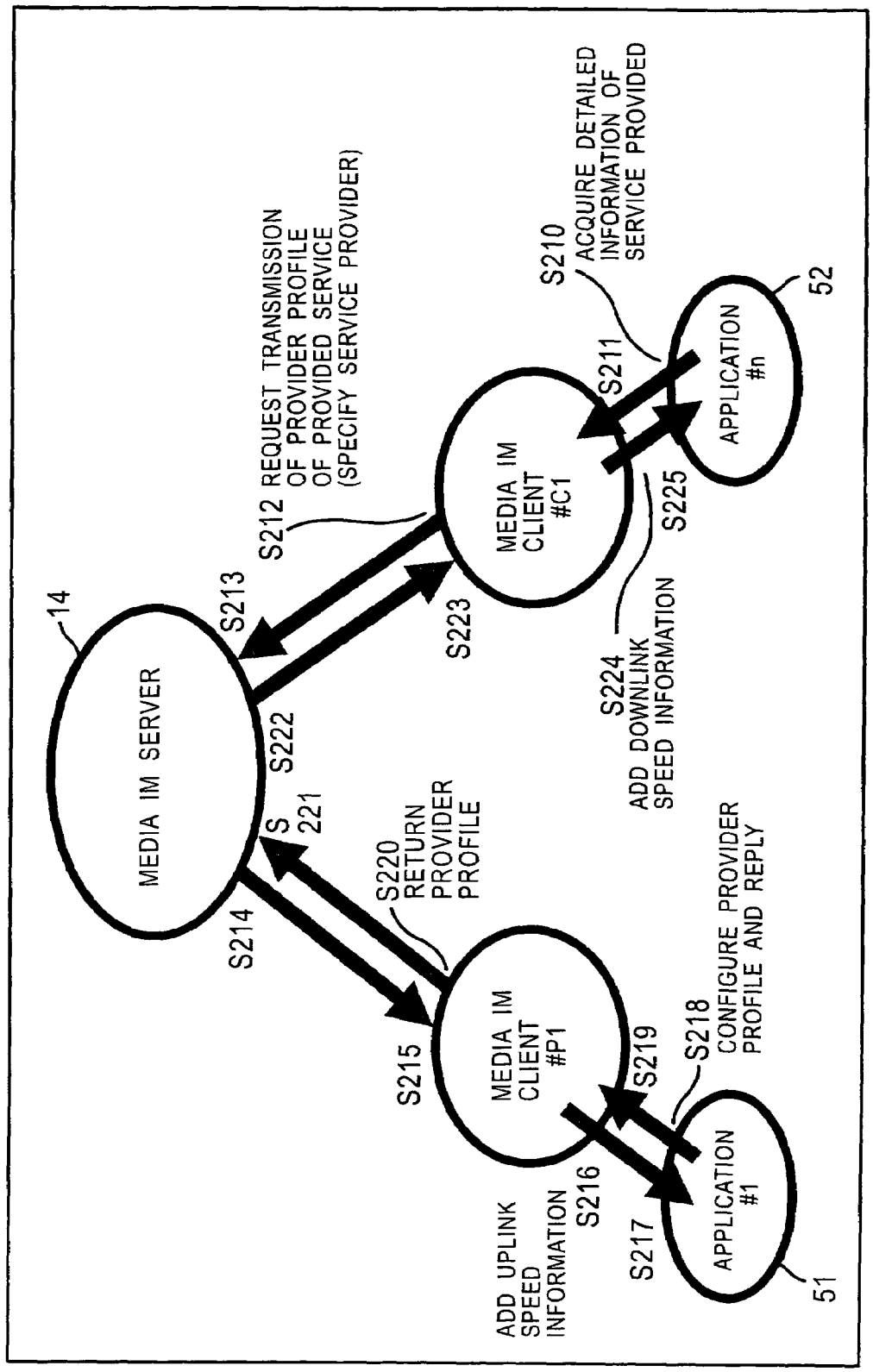
FIG. 16 is a flowchart showing the operation of the network system shown in FIG. 13.

Then, the processing of steps S210 through 225 shown in FIG. 16 is executed in place of the processing of steps S10 through S25 shown in FIG. 5.

Basically, the processing of steps S210 through S225 is similar to the processing of steps S10 through 25 shown in FIG. 5. However, the processing of step S216 corresponding to step S16 shown in FIG. 5 and the processing of step S224 corresponding to step S24 shown in FIG. 5 are different from the processing of step S16 or S24 shown in FIG. 5.

Other processing is similar to that shown in FIG. 5, and only the processing of steps S216 and S224 will thus be described.

In the processing of step S16 shown in FIG. 5, the media IM client #P1 supplies the request from the media IM server 14 (the request for transmission of the provider profile of the service provided by the service provider 51) to the application #1 serving as the service provider 51 (this request includes address information for specifying the service provider 51). In the processing of step S16, only the request from the media IM server 14 is supplied to the application #1; whereas, in the processing of step S216, the media IM client #P1 further adds its uplink speed information when it is in a position of transmitting data to the media IM client #C1. The uplink speed information is uplink speed information of the media IM client #P1 measured by the speed measurement process in step S105 shown in FIG. 14.

For example, when the uplink speed (bit rate) obtained by the processing of step S105 shown in FIG. 14 is 128 Kbps, information indicating an uplink speed (bit rate) of 128 Kbps is sent to the application #1 serving as the service provider 51.

In step S24 shown in FIG. 5, the media IM client #C1 sends the reply from the media IM client #P1 (the provider profile reply to be provided to the service consumer 52) to the application #n. In the processing of step S24, only the reply from the media IM client #P1 (including the uplink information of the media IM client #P1) is sent to the application #n; whereas, in the processing of step S224, the media IM client #C1 adds its downlink speed information to the reply when it is in a position of receiving data. The downlink speed information is downlink speed information of the media IM client #C1 measured by the speed measurement process in step S155 shown in FIG. 15.

For example, when the downlink speed (bit rate) obtained by the processing of step S155 shown in FIG. 15 is 48 Kbps, information indicating a downlink speed (bit rate) of 48 Kbps is sent to the application #n serving as the service consumer 52. Thus, the application #n is notified of both the uplink speed of the media IM client #P1 and the downlink speed of the media IM client #C1.

Other processing is similar to that shown in FIG. 5.

This processing allows the application #1 to know the uplink speed of the media IM client #P1, and also allows the application #n to know the downlink speed of the media IM client #C1. Therefore, a user need not perform a time-consuming operation to manually set the transmission speed (link speed) in the application (the application #1 or the application. #n). Moreover, the transmission speed can be accurately set. This allows for communication at an appropriate transmission speed in a quick and easy manner.

Figure 6:
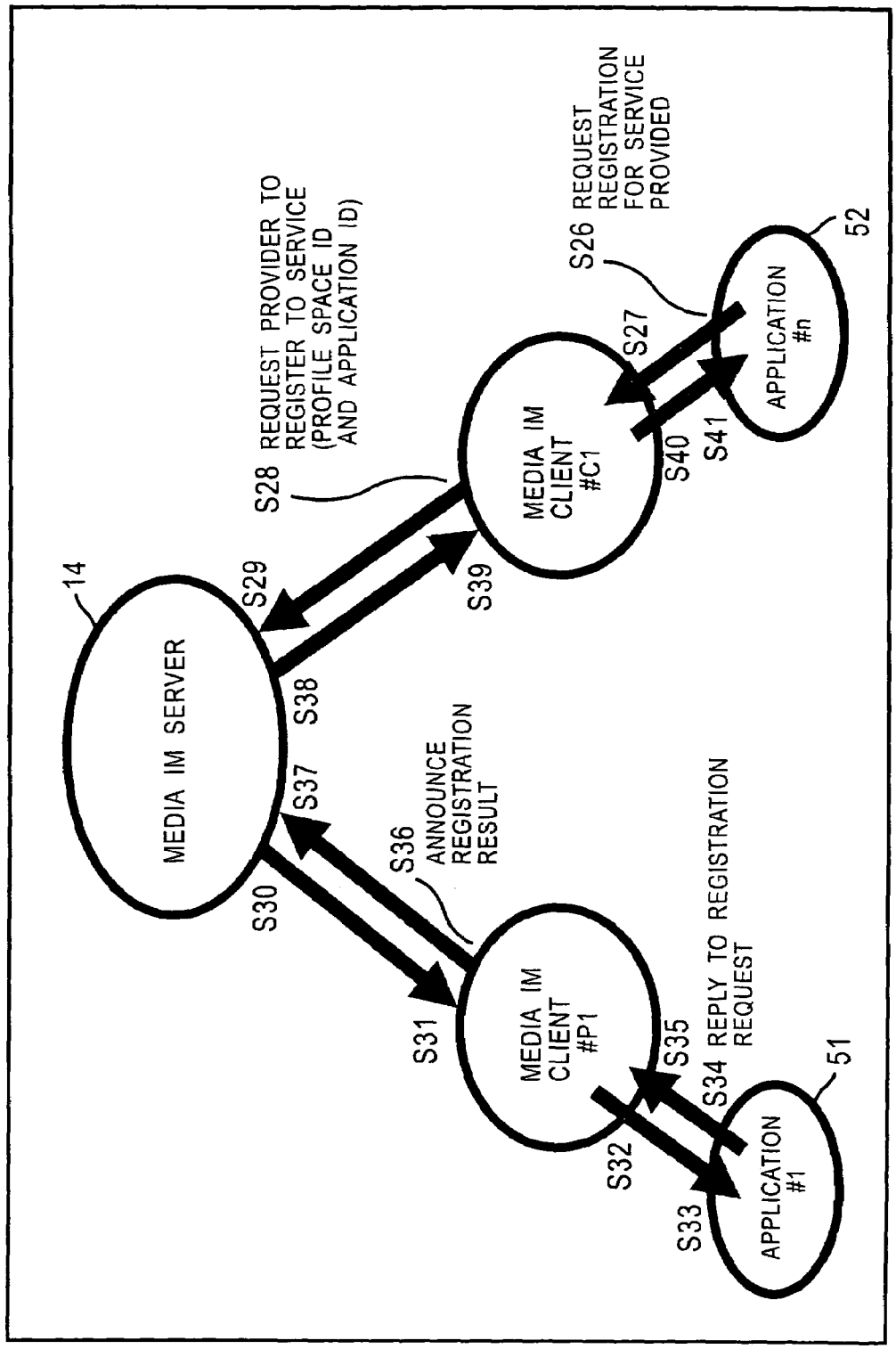
FIG. 6 is a flowchart showing the operation of the network system shown in FIG. 1.
Figure 7:
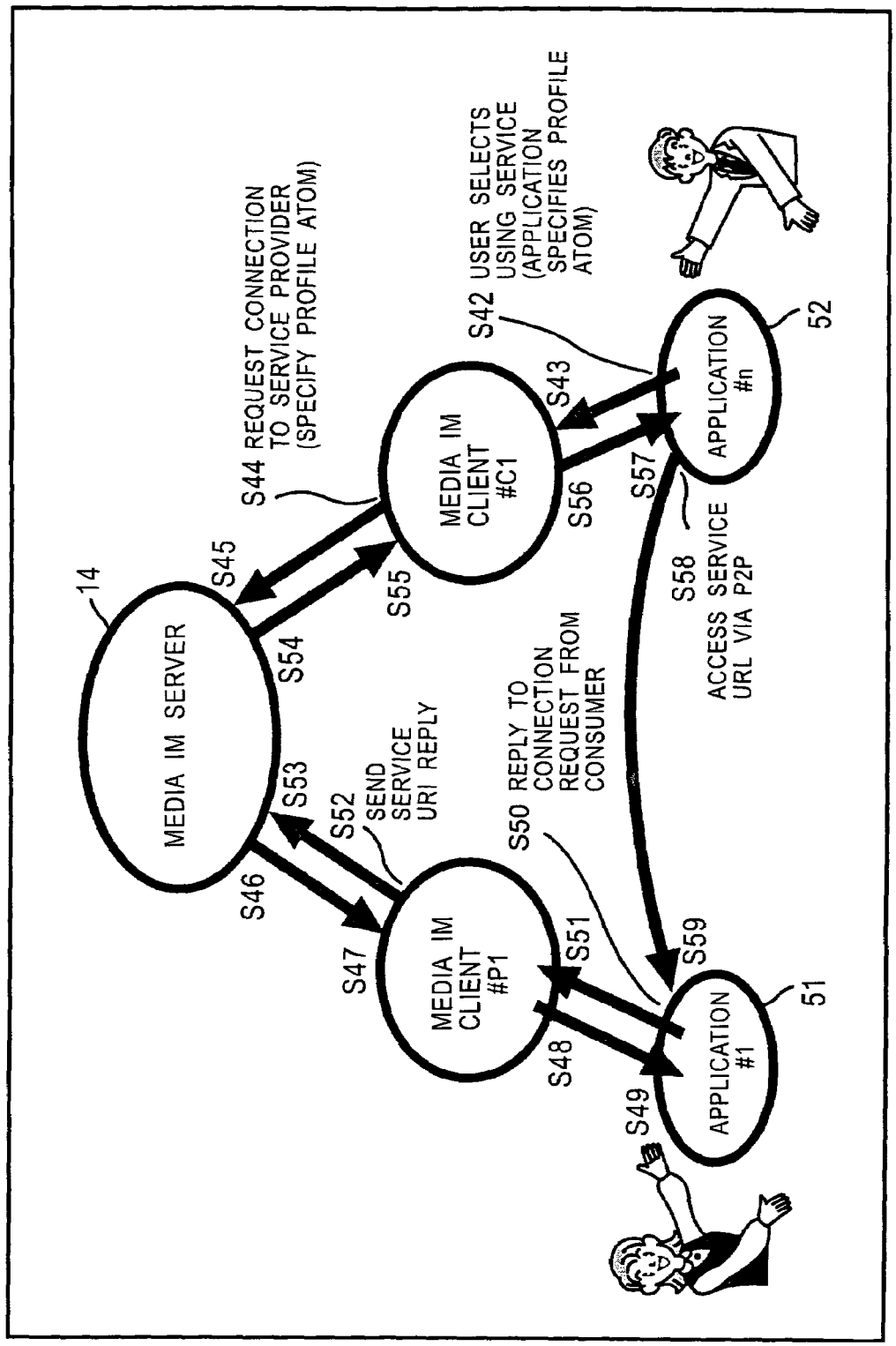
FIG. 7 is a flowchart showing the operation of the network system shown in FIG. 1.
Figure 17:
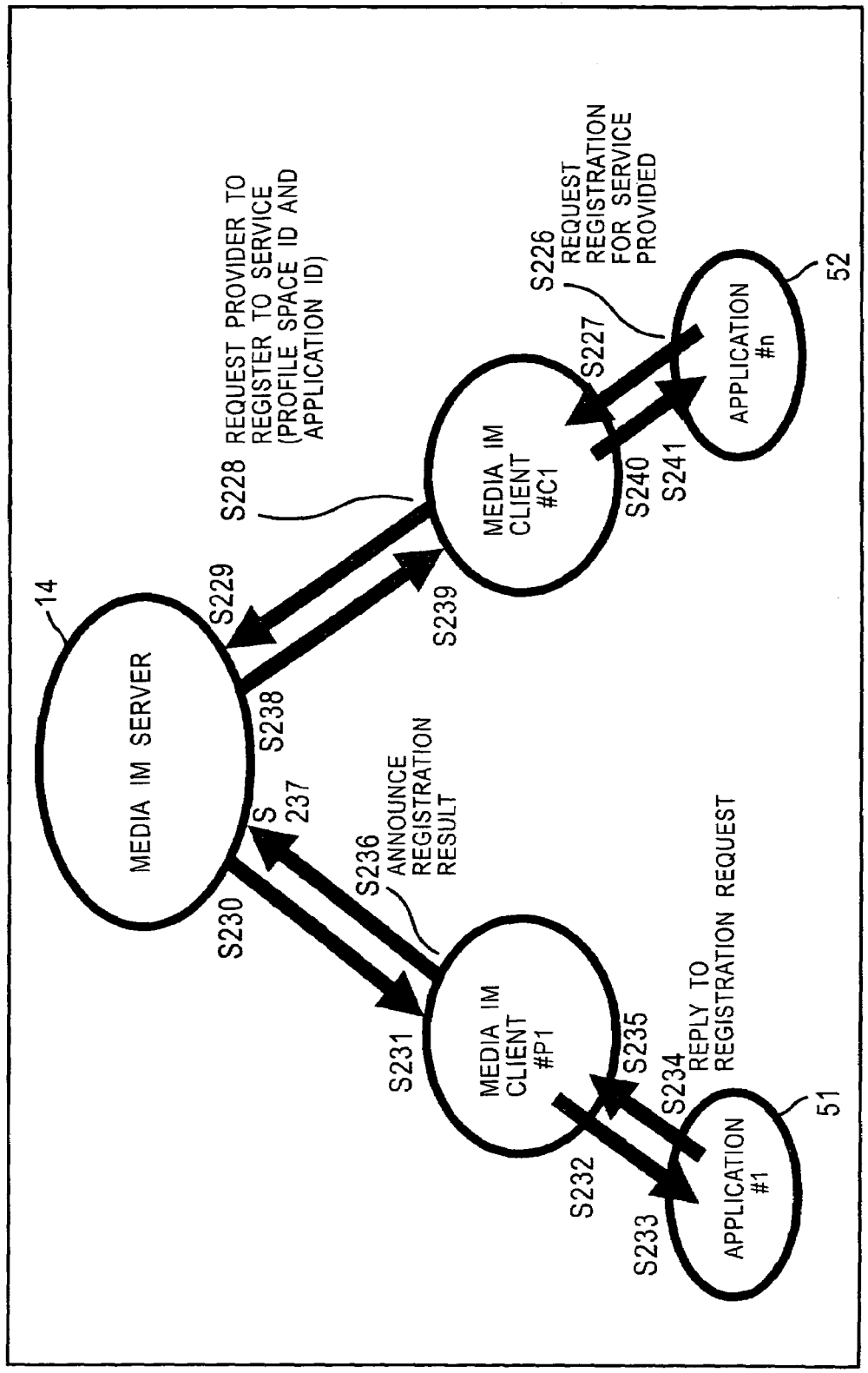
FIG. 17 is a flowchart showing the operation of the network system shown in FIG. 13.

After the processing of steps S210 through S225 shown in FIG. 16 (corresponding to the processing of steps S10 through S25 shown in FIG. 5), the processing of steps S226 through S241 shown in FIG. 17 is executed in place of the processing of steps S26 through S41 shown in FIG. 6.

Basically, the processing of steps S226 through S241 is similar to the processing of steps S26 through S41 shown in FIG. 6. However, the processing of step S226 shown in FIG. 17 corresponding to step S26 shown in FIG. 6 and the processing of step S233 shown in FIG. 17 corresponding to step S33 shown in FIG. 6 are different from the processing of step S26 or S33 shown in FIG. 6.

Other processing is similar to that shown in FIG. 6, and only the processing of steps S226 and S233 will thus be described.

If a match is found between the provider profile of the service provider 51 and the consumer profile generated by the application #n, in the processing of step S26 shown in FIG. 6, the application #n requests the service provider 51 to register itself (i.e., the service consumer 52) to the service provided. In the processing of step S26, this registration request is only submit to the media IM client #C1; whereas, in the processing of step S226, the transmission speed (set speed) between the media IM client #P1 and the media IM client #C1 is added to the registration request. The details of the processing of step S226 (a registration request process for the service provided) will now be described with reference to the flowchart shown in FIG. 18.

As described above, the provider profile supplied in step S225 shown in FIG. 16 to the application #n from the media IM client #C1 includes the uplink speed information of the media IM client #P1, which is added in the processing of step S216, and the downlink speed information of the media IM client #C1, which is added in the processing of step S224.

In step S301, the application #n retrieves (reads) the uplink speed information of the media IM client #P1 (the speed information added in step S216 shown in FIG. 16), which is contained in the provider profile of the service provider 51. In step S302, the application #n compares the uplink speed of the service provider 51 (i.e., the media IM client #P1) with the downlink speed of the application #n (i.e., the service consumer 52, or the media IM client #C1), and defines the lower speed as the set speed. In this example, the uplink speed of the media IM client #P1 is 128 Kbps while the downlink speed of the media IM client #C1 48 Kbps, and the set speed (transmission speed) is thus 48 Kbps (i.e., the downlink speed of the media IM client #C1).

In step S303, the application #n sends the registration request for the provided service and the set speed (transmission speed) added thereto.

In step S33 shown in FIG. 6, the application #1 only receives the registration request from the media IM client #C1; whereas, in the processing of step S233, the application #1 receives the set speed added (in the processing of step S303 (step S226)) to the registration request from the media IM client #C1, and sets the set speed as its information transmission speed. The details of the processing of step S233 (a registration request receiving and speed setting process) will now be described with reference to the flowchart shown in FIG. 19. The processing is executed in association with the processing shown in FIG. 18.

Figure 18:
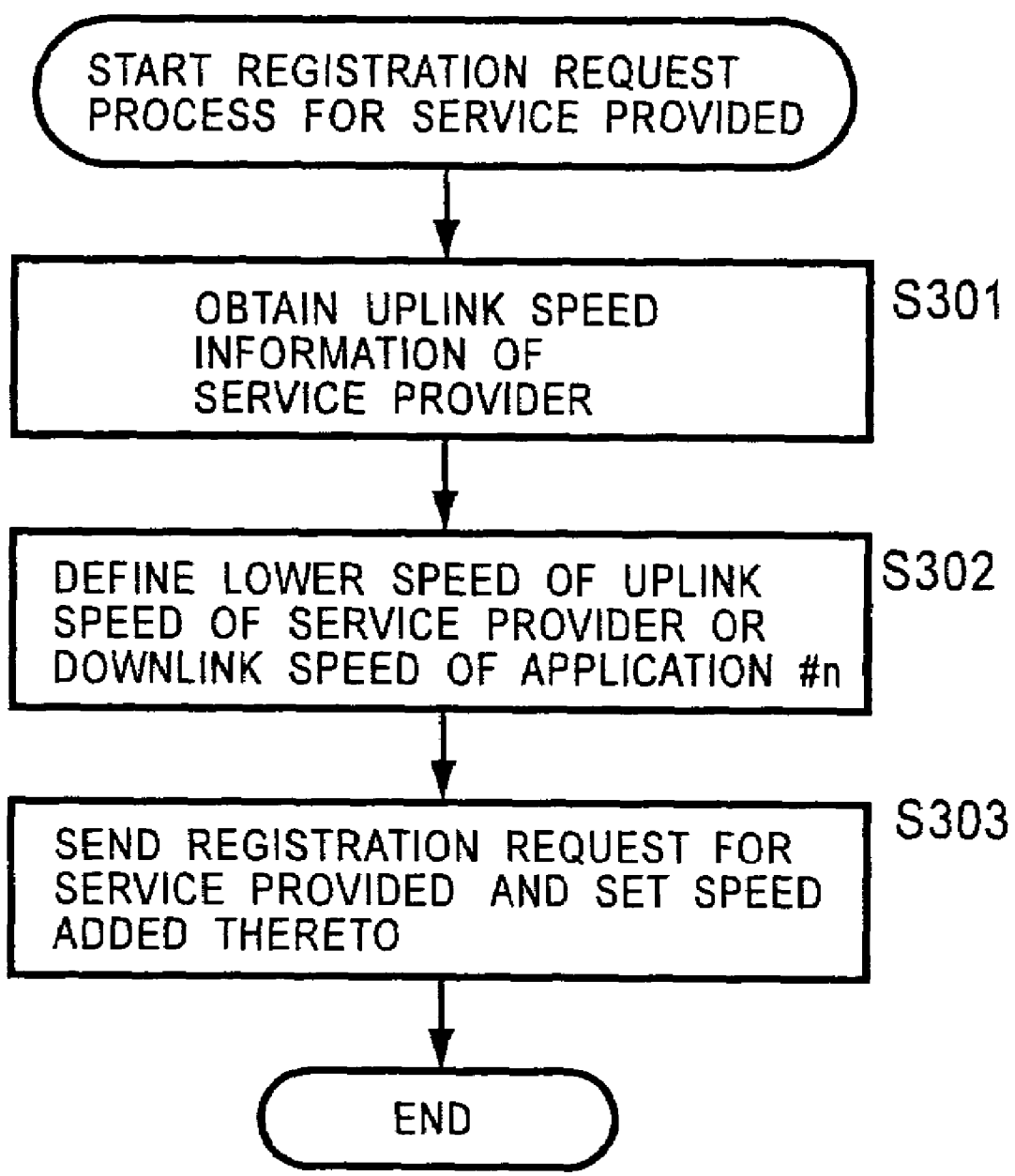
FIG. 18 is a flowchart showing processing of step S226 shown in FIG. 17.

In the processing shown in FIG. 18 (the processing of step S226), the registration request having the set speed added thereto is sent from the service consumer 52. In step S351, the application #1 receives the registration request including the set speed.

In step S352, the application #1 sets its information transmission speed to the set speed contained in the registration request received in the processing of step S351. The uplink speed of the media IM client #P1 is 128 Kbps while the set speed is 48 Kbps in this example, and the application #1 thus sets its information transmission speed (uplink speed) to 48 Kbps.

This allows an information sending (providing) apparatus to send information at the optimum communication speed (set speed) to an information receiving apparatus.

Figure 19:
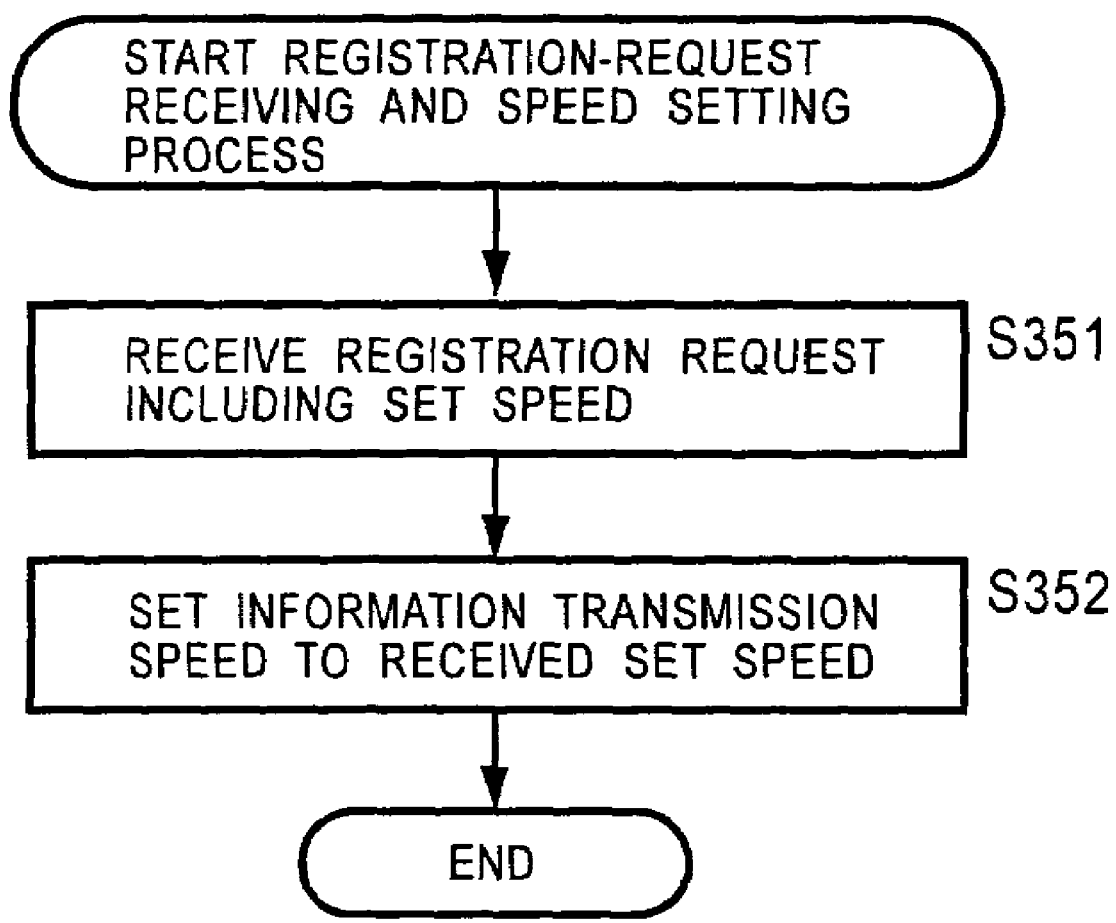
FIG. 19 is a flowchart showing processing of step S233 shown in FIG. 17.
Figure 20:
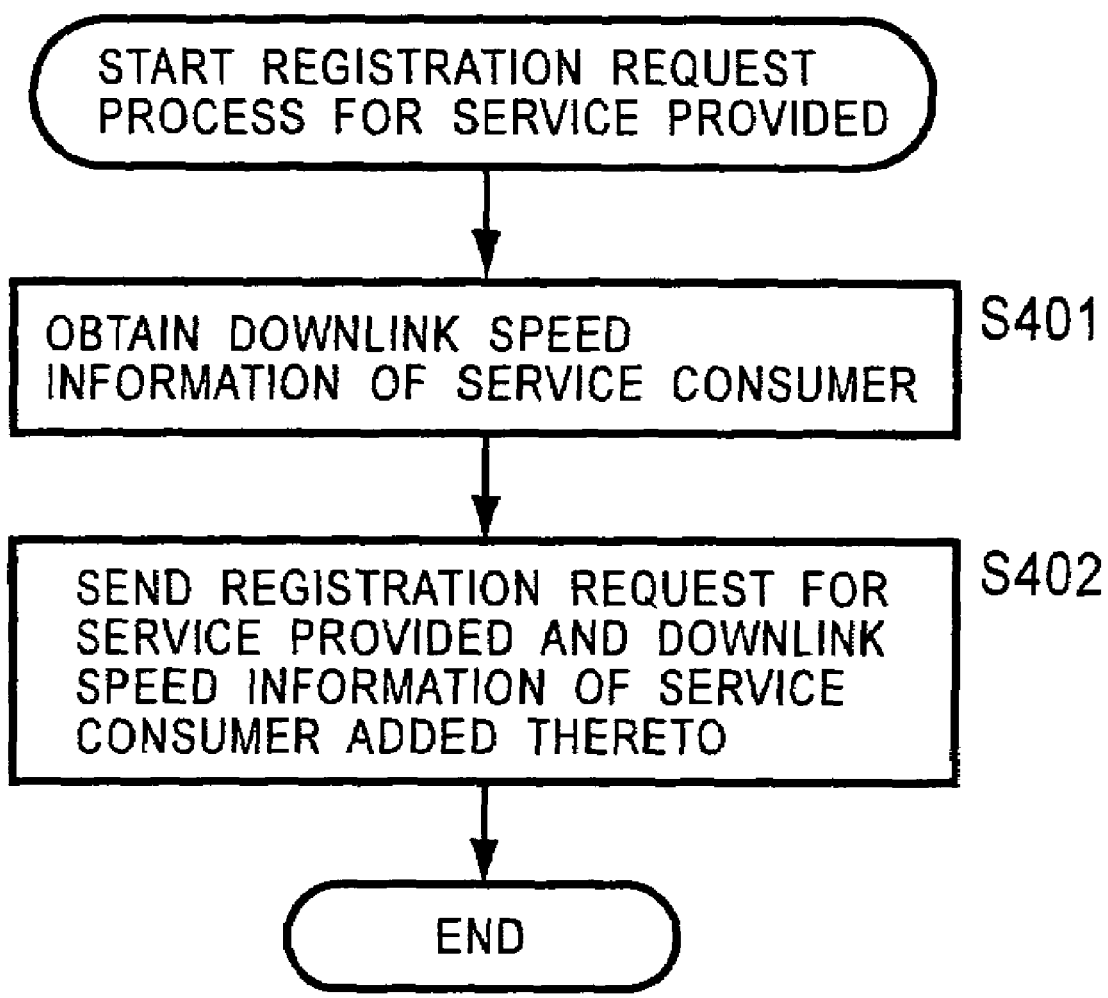
FIG. 20 is a flowchart showing processing of step S226 shown in FIG. 17.
Figure 21:
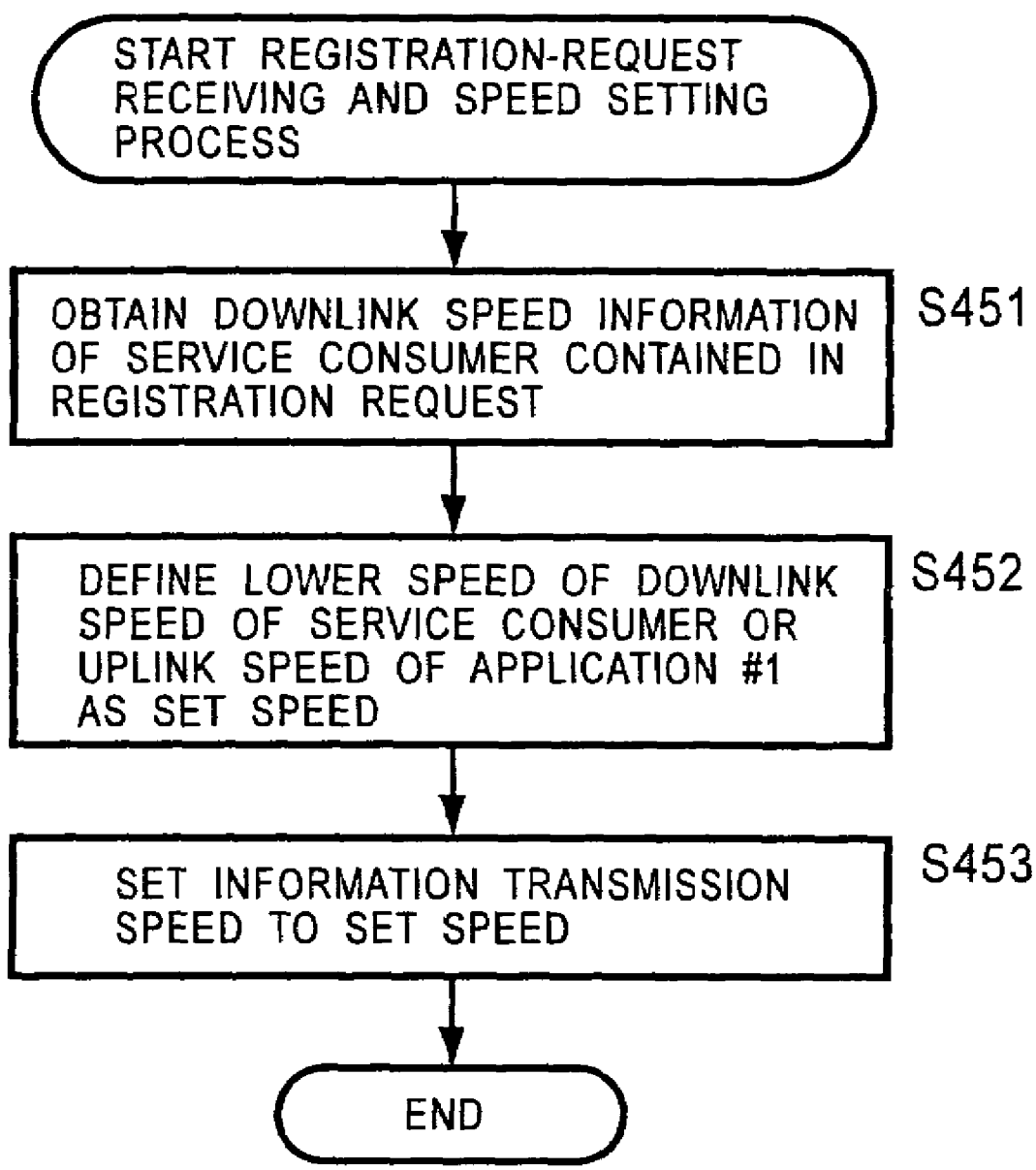
FIG. 21 is a flowchart showing processing of step S233 shown in FIG. 17.

The processing of steps S226 and S233 may be either the processing shown in FIGS. 18 and 19 or the processing shown in FIGS. 20 and 21. More specifically, the processing shown in FIGS. 18 and 19 allows the application #n serving as the service consumer 52 to determine the communication speed (set speed); whereas the processing shown in FIGS. 20 and 21 allows the application #1 serving as the service provider 51 to determine the communication speed (set speed). This will now be described.

In this example, if a match is found between the provider profile of the service provider 51 and the consumer profile generated by the application #n, in step S226, the application #n executes the processing shown in the flowchart of FIG. 20.

In step S401, the application #n obtains the downlink speed information of the media IM client #C1 (the speed information added in step S224 shown in FIG. 16), which is contained in the provider profile of the service provider 51. In step S402, the application #n sends the registration request for the provided service, to which the downlink speed information (the downlink speed information of the media IM client #C1) is added. In this example, information indicating that the downlink speed of the media IM client #C1 is 48 Kbps is added.

The application #1 executes, in step S233, the processing shown in FIG. 21 corresponding to the processing of FIG. 20.

In the processing shown in FIG. 20 (the processing of step S226), the registration request having the downlink speed information of the media IM client #C1 (i.e., the service consumer 52) added thereto is sent from the service consumer 52. In step S451, the application #1 receives the registration request containing the downlink speed information, and extracts the downlink speed information.

In step S452, the application #1 defines the lower speed of the downlink speed of the service consumer 52 (i.e., the media IM client #C1) or the uplink speed of the application #1 (i.e., the media IM client #P1) as the set speed. In this example, the uplink speed of the media IM client #P1 is 128 Kbps while the downlink speed of the media IM client #C1 is 48 Kbps, and the set speed is thus 48 Kbps (i.e., the downlink speed of the media IM client #C1).

In step S453, the application #1 sets its information transmission speed to the set speed determined in the processing of step S452. In this example, the uplink speed of the media IM client #P1 is 128 Kbps while the set speed is 48 Kbps, and the application #1 thus sets its information transmission speed (uplink speed) to 48 Kbps. This allows an information sending (providing) apparatus to send information at the optimum communication speed to an information receiving apparatus.

Accordingly, the processing of steps S226 and S233 may be either the processing shown in FIGS. 18 and 19 or the processing shown in FIGS. 20 and 21. For not one of transmission and reception of information but both, both the uplink speed and the downlink speed may be sent so as to determine the set speeds therefor. The speed information is not necessarily collected at only one terminal, but may be sent to both terminals so that either terminal can control the communication speed.

The details of the speed measurement processing of step S105 shown in FIG. 14 or step S155 shown in FIG. 15 will now be described.

The speed measurement method will be described in the context of the use of HTTP, which is an implementation of TCP (Transmission Control Protocol), and the use of a packet pair, which is an implementation of UDP (User Datagram Protocol).

First, a speed measurement method in the context of the use of HTTP will be described.

Figure 22:
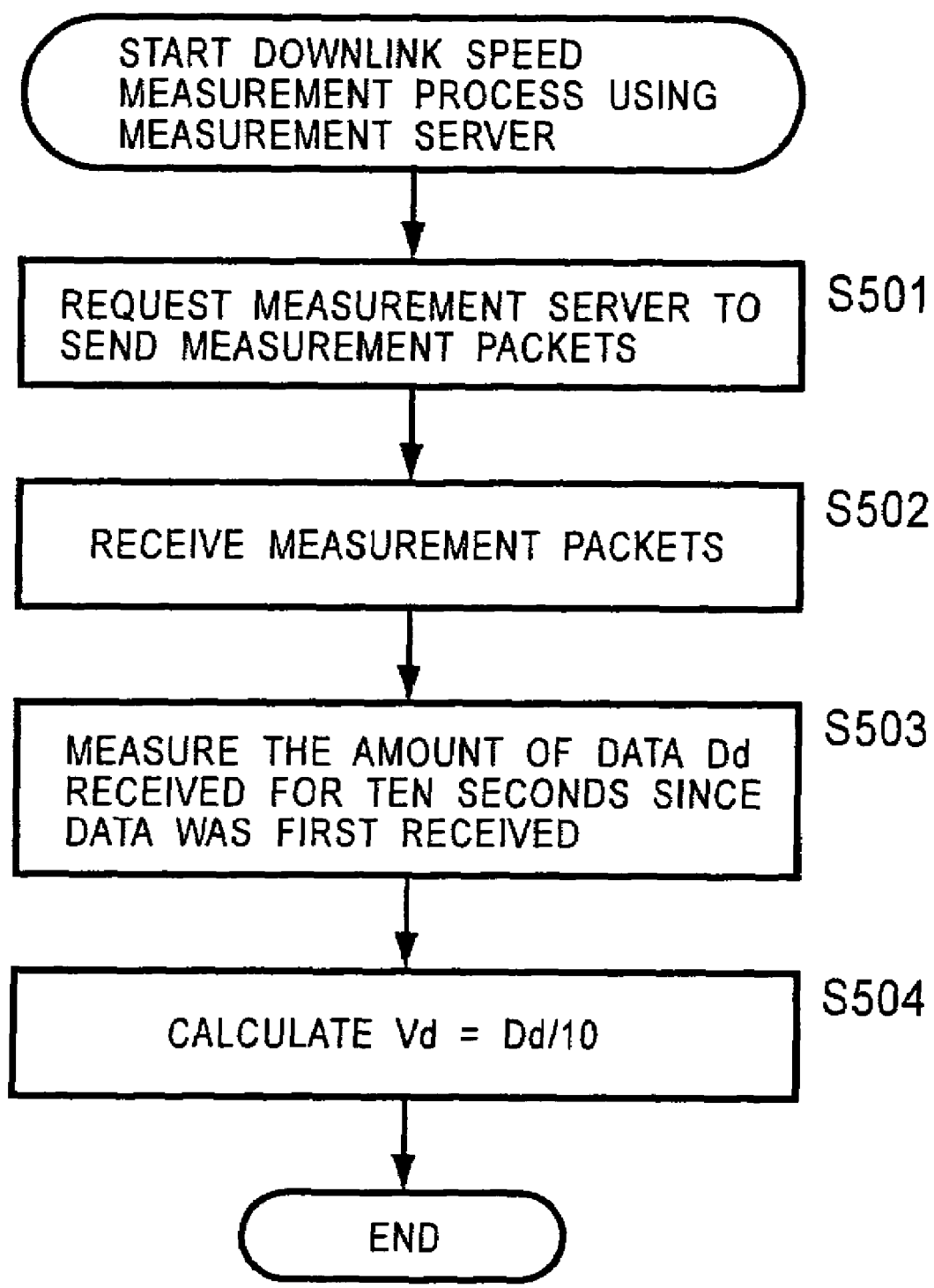
FIG. 22 is a flowchart showing processing of step S155 shown in FIG. 15.

FIG. 22 is a flowchart showing a downlink-speed measurement process performed in a media IM client using the measurement server 200. The process will now be described in the context of downlink speed measurement of the media IM client #C1 shown in FIG. 15. For example, in a case where the media IM client #C1 is installed in the personal computer 12 shown in FIG. 13, the media IM client #C1 serving as the personal computer 12 is connected to the Internet 1 via the access link 223-2. The measurement server 200 is connected to the Internet 1 via the main link 222.

In step S501, the media IM client #C1 installed in the personal computer 12 accesses the measurement server 200 to request transmission of measurement packets. In response to the request, the measurement server 200 sends measurement packets. The measurement packets are transmitted via the main link 222, the Internet 1, and the access link 223-2.

In step S502, the media IM client #C1 receives the measurement packets sent from the measurement server 200. The measurement packets are used for measuring the transmission rate, and may have any fixed amount of data. However, due to data compression by analog modems or the like, the throughput can appear to increase. Thus, measurement using random data is preferable.

In step S503, the media IM client #C1 measures the amount of data Dd (bit) received for, for example, ten seconds since it first received the data.

In step S504, the media IM client #C1 calculates "Dd/10" to determine the downlink speed Vd (bit/second) (in other words, "Vd=Dd/10" is calculated).

The measurement server 200 is connected to the main link 222 of a sufficiently broad bandwidth (broader than at least the access links 223-1 through 223-3) in order to achieve the measurement function. Thus, the value of the downlink speed Vd is equivalent to the speed of the access link 223-2, which is a bottleneck of the transmission path consisting of the main link 222 and the access link 223-2.

As a result of the processing shown in FIG. 22, the downlink speed Vd of the media IM client #C1 installed in the personal computer 12 is determined.

A uplink speed measurement process performed in a media IM client using the measurement server 200 will now be described with reference to the flowchart shown in FIG. 23. The process will be described in the context of uplink speed measurement of the media IM client #P1 shown in FIG. 14. In a case where the media IM client #P1 is installed in the personal computer 11 shown in FIG. 13, the media IM client #P1 serving as the personal computer 11 is connected to the Internet 1 via the access link 223-1.

In step S551, the media IM client #P1 accesses the measurement server 200 via the access link 223-1 and the Internet 1 to request measurement, and sends measurement packets. The packets are used for measuring the transmission rate, and may have any amount of data as long as the data amount is clearly recognized. However, due to data compression by analog modems or the like, the throughput can appear to increase. Thus, measurement using random data is preferable.

In step S552, the media IM client #P1 measures the amount of data Du (bit) received for, for example, ten seconds since it first received the data.

In step S553, the media IM client #P1 calculates "Du/10" to determine the uplink speed Vu (bit/second) of the personal computer 11 (i.e., the media IM client #P1) (in other words, "Vu=Du/10" is calculated).

Since the main link 222 has a much broader bandwidth than the access link 223-1, the uplink speed Vu is equivalent to the speed of the access link 223-1, which is a bottleneck of the transmission path consisting of the access link 223-1 and the main link 222.

Figure 23:
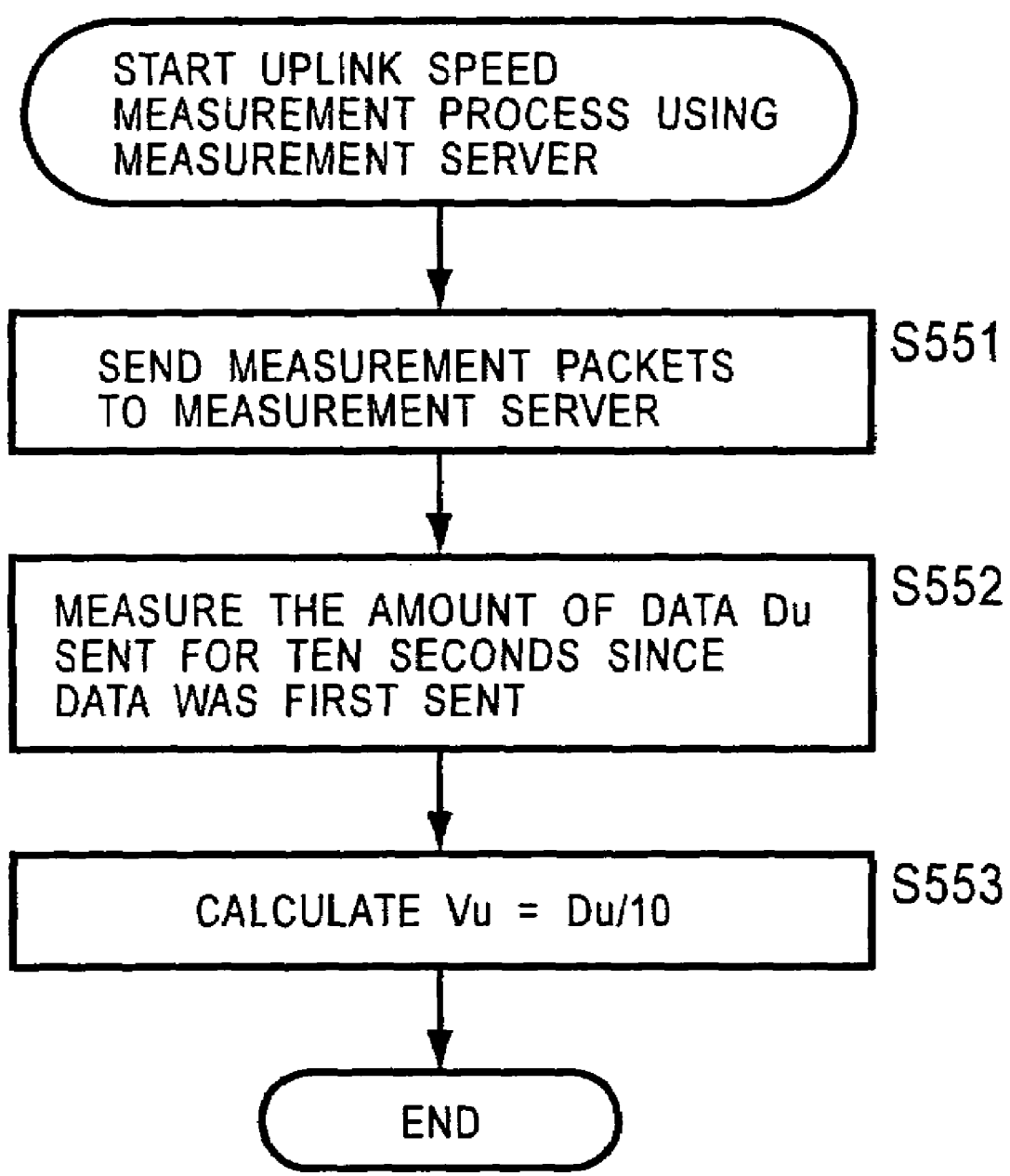
FIG. 23 is a flowchart showing processing of step S105 shown in FIG. 14.

As a result of the processing shown in FIG. 23, the uplink speed Vu is determined.

For measurement of the uplink speed, the media IM client #C1 also executes the processing shown in FIG. 23, and, for measurement of the downlink speed, the media IM client #P1 also executes the processing shown in FIG. 22.

Therefore, the processing shown in FIG. 22 and the processing shown in FIG. 23 are appropriately executed when each media IM client (each of the media IM clients #1 through #4) is to determine the downlink speed and the uplink speed, respectively.

Next, a speed measurement method in the context of the use of a packet pair will be described.

Figure 24:
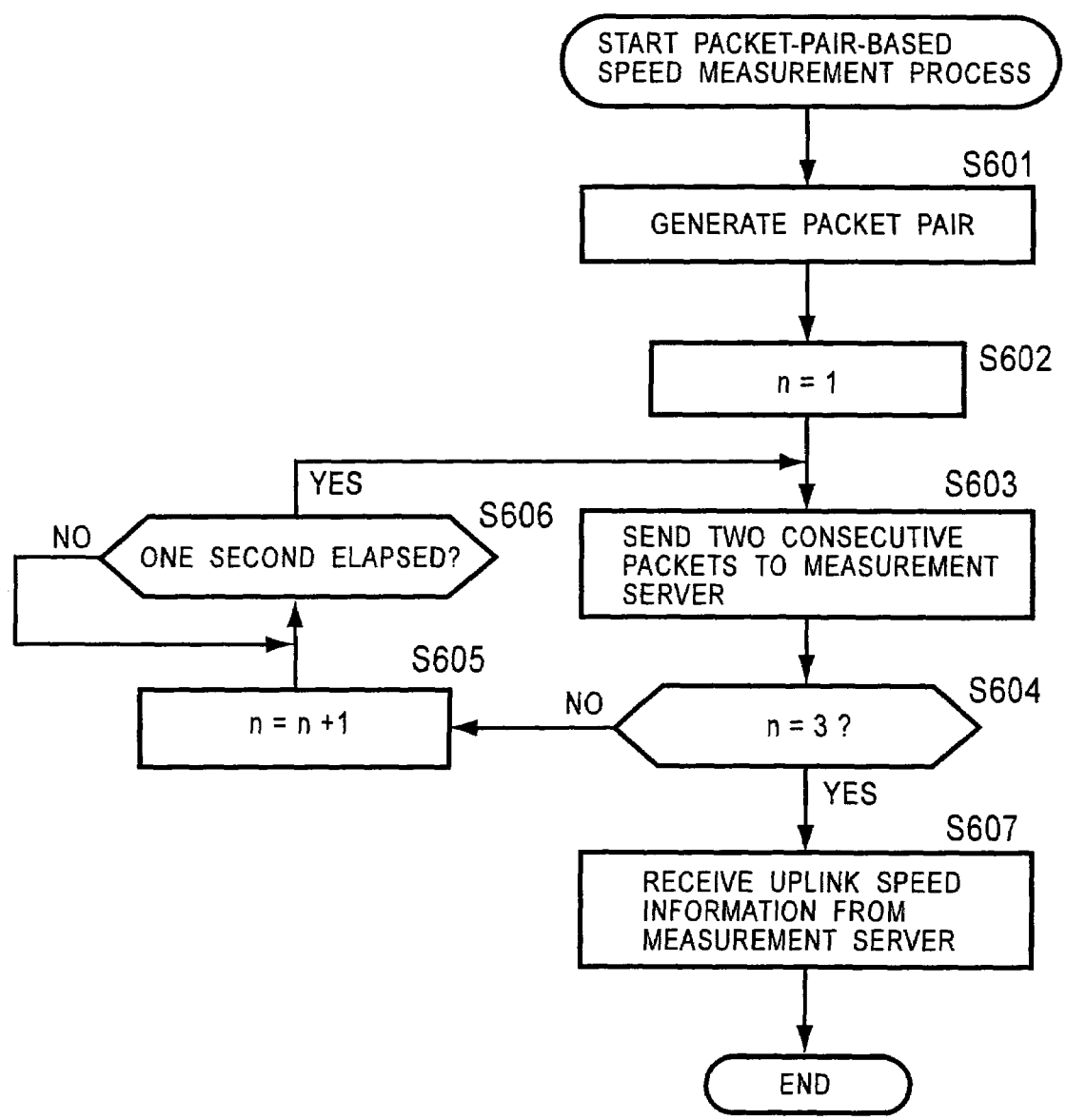
FIG. 24 is a flowchart showing processing of step S105 shown in FIG. 14.

FIG. 24 is a flowchart showing a speed measurement process performed in the media IM client based on a packet pair. The process will be described in the context of speed measurement of the media IM client #P1 shown in FIG. 14, by way of example. In a case where the media IM client #P1 is installed in the personal computer 11 shown in FIG. 13, the media IM client #P1 serving as the personal computer 11 is connected to the Internet 1 via the access link 223-1. The measurement server 200 is connected to the Internet 1 via the main link 222.

In step S601, the media IM client #P1 installed in the personal computer 11 generates a packet pair. The generated packet pair may have any length. A packet pair having a large capacity requires much time to pass through the bottleneck, with the merit of reducing the measurement error. However, in this case, the network load is high, and each packet of the packet pair has a packet length of, for example, 500 bytes (including the IP header). The packet pair is constituted of two packets.

Figure 25:
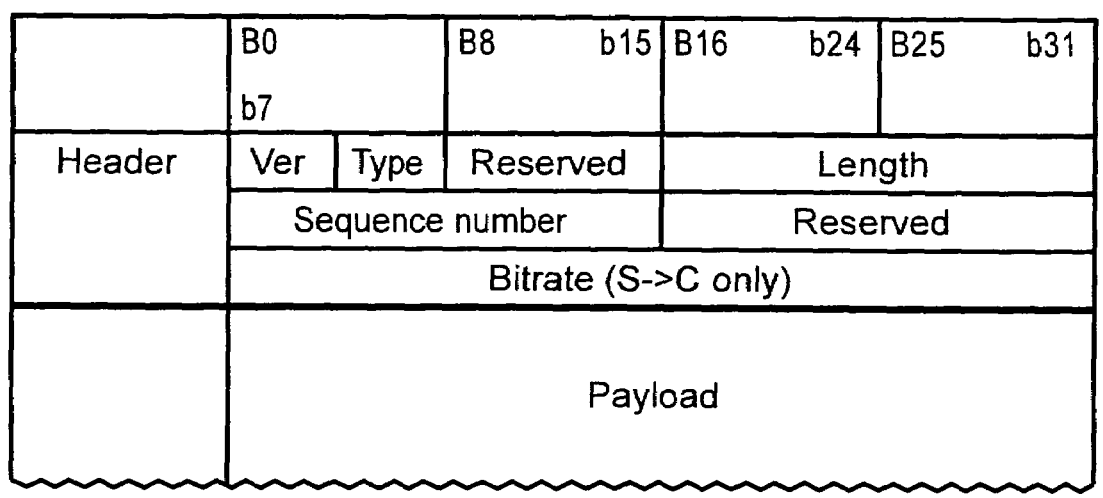
FIG. 25 is a view showing an example packet format.

One packet format has the structure shown in, for example, FIG. 25. In FIG. 25, "Header" contains "Ver" indicating protocol version information, "Type" indicating the protocol type, "Length" indicating the packet length exclusive of the IP/UDP header, "Sequence" indicating the sequence number, "Reserved" indicating a reserved area, and "Bitrate" indicating the measured bit rate. "Payload" has desired data embedded therein.

The sequence number contained in the header is information indicating whether or not packet loss has occurred in the measurement server 200. The type has "Request" or "Reply" recorded therein in this example. The payload may have desired data embedded therein, but preferably has random data because of compression by analog modems or the like.

Referring back to FIG. 24, the media IM client #P1 initially sets a variable n to 1 in step S602, and sends two consecutive packets with consecutive sequence numbers to the measurement server 200 in step S603. The packets are sent to the measurement server 200 via the access link 223-1, the Internet 1, and the main link 222. The media IM client #P1 sends the two consecutive packets as quickly as possible. The sequence numbers may start with an even or odd number as long as they are consecutive. For convenience of explanation, it is assumed herein that the packets are sent in order of even number and odd number.

In step S604, the media IM client #P1 determines whether or not n=3. If it is determined that n is not equal to 3, then in step S605, the value of the variable n increments by 1. In this example, it is determined in step S602 that n=1, and n=1+1=2 is calculated.

In step S606, the media IM client #P1 determines whether or not one second has elapsed since the previous packet was sent (after the processing of step S603), and waits for one second to elapse. If it is determined in step S606 that one second has elapsed, the process returns to step S603, and the following processing is repeated. That is, two packets (one packet pair) with consecutive sequence numbers are resent and n increments by 1 until n=3. As a result, three packet pairs are delivered.

If it is determined in step S604 that n=3, the measurement server 200 determines the speeds for three transmissions of the packet pairs (i.e., the uplink speeds), and sends the speeds to the media IM client #P1 installed in the personal computer 11 (in step S757 shown in FIG. 26, as described below). Then in step S607, the media IM client #P1 receives the uplink speed information from the measurement server 200, and then the process ends.

In order to reduce the occurrence of measurement errors, it is preferable that a packet pair be sequentially sent a plurality of times by a single measurement set (speed measurement process). However, sending measurement packets multiple times for a short period of time places a load on the network (the access link 223-1, the Internet 1, and the main link 222). Thus, as shown in FIG. 24, a single measurement set (speed measurement process) is finished by repeating one transmission, which is performed per second (that is, two packets are sent per second), three times. In this example, a single measurement set (speed measurement process) takes about three seconds or more, during which the measurement can be carried out three times.

A measurement process executed by the measurement server 200 in association with the processing by the personal computer 11 shown in FIG. 24 will now be described with reference to the flowchart shown in FIG. 26.

The measurement server 200 initially sets the variable n to 1 in step S751, and receives a packet pair from the media IM client #P1 in step S752. This packet pair is the one sent by the media IM client #P1 in the processing of step S603 shown in FIG. 24 (the packet pair sent when n=1). The packet pair is also the one sent via the access link 223-1, the Internet 1, and the main link 222.

In step S752, the measurement server 200 determines a bottleneck link speed B. The bottleneck link speed B is given by B=L×8/T, where L denotes the packet length (in this example, 500 bytes), and T denotes the time corresponding to the difference between the arrival time of the first packet of the two packet having consecutive sequence numbers (the two consecutive packets sent in step S603 shown in FIG. 24 when n=1) and the arrival time of the second packet. Therefore, the bottleneck link speed B for the first packet pair when n=1 is determined.

Figure 27:
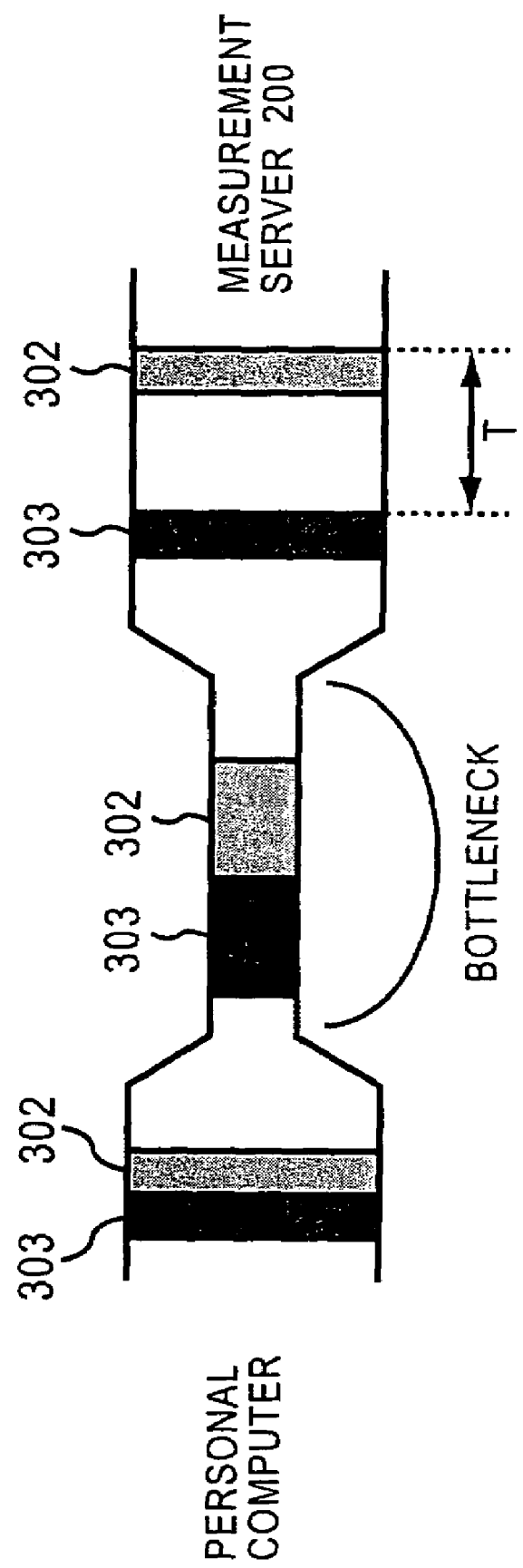
FIG. 27 is a diagram showing packet-pair-based measurement.

FIG. 27 is a conceptual diagram of such packet-pair-based measurement. Out of the two consecutive packets sent from the media IM client #P1 in step S603 shown in FIG. 24, the first sent packet with an even sequence number is represented by a packet 302, and the second sent packet with an odd sequence number is represented by a packet 303.

When a packet pair is sent from the media IM client #P1, the packets 302 and 303 are quickly sent in a sequential manner, resulting in substantially no interval between the two packets. However, the packets pass through the narrowband access link 223-1, which is a bottleneck, thus requiring a long time to transmit the packets. Then, when the packets pass through the broadband main link 222, it requires a short time to transmit the packets, resulting in an interval between the packets 302 and 303. This causes a deviation in the arrival time of the packets 302 and 303 at the measurement server 200 (the period of time that indicates the deviation in the arrival time of the packets 302 and 303 is indicated by T).

Referring back to FIG. 26, in step S754, the measurement server 200 determines whether or not n=3. If it is determined that n is not equal to 3, then in step S755, the variable n increments by 1. In this example, n=1+1=2 is calculated.

Then, the process returns to step S752, and the following processing is repeated. That is, a second packet pair (the packet pair sent when n=2 in FIG. 24) is received, the second bottleneck link speed B is determined, a third (when n=3 in FIG. 24) packet pair is received, and the third bottleneck link speed B is determined.

If it is determined in step S754 that n=3, then in step S756, the measurement server 200 determines the mean value of the speeds B. For example, where the speed B determined when n=1 is represented by speed B1, the speed B determined when n=2 is represented by speed B2, and the speed B determined when n=3 is represented by speed B3, "(B1+B2+B3)/3" is calculated.

In step S757, the measurement server 200 sends (reports) the mean value of the speeds B determined in step S756 to the personal computer 11.

Figure 26:
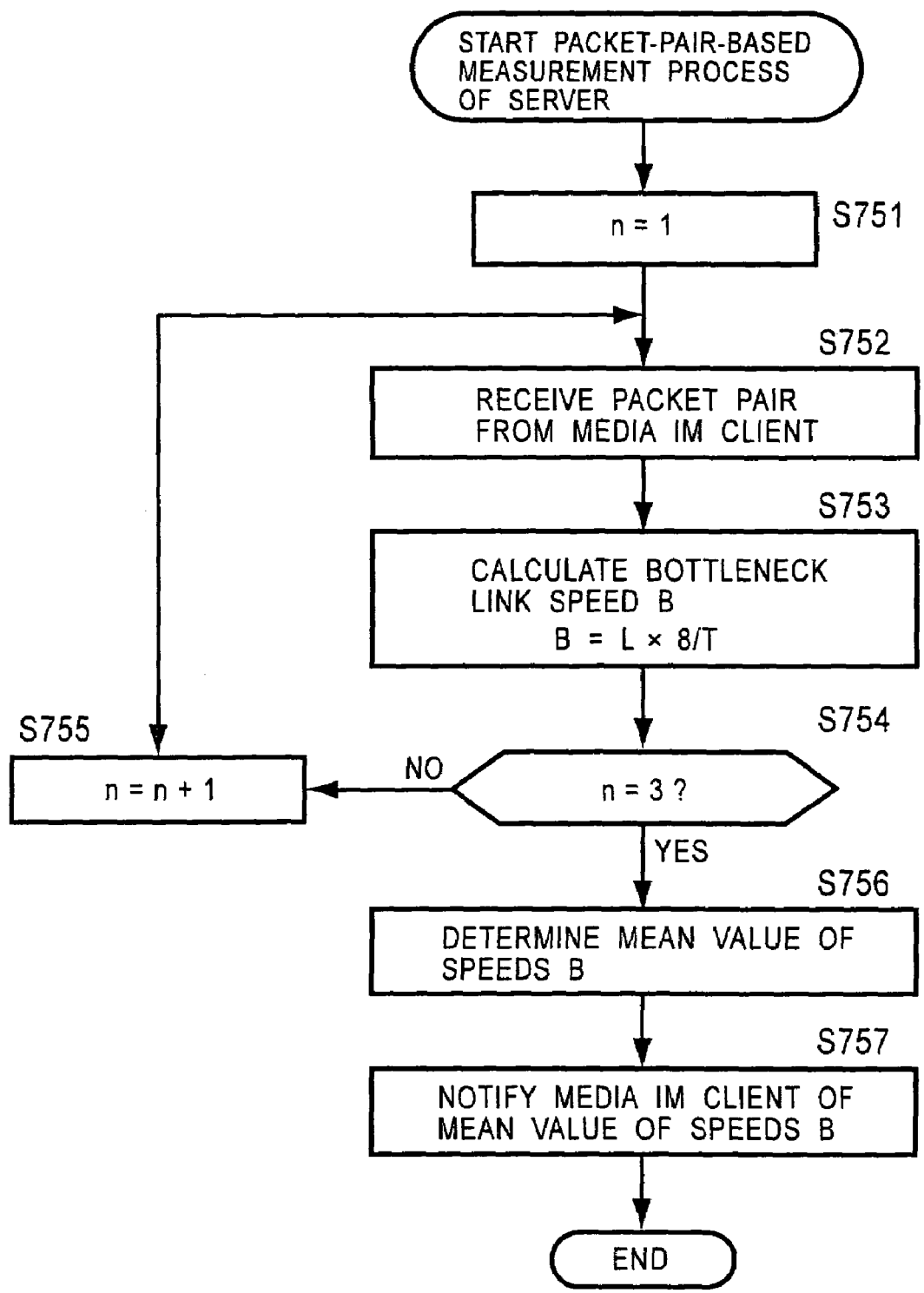
FIG. 26 is a flowchart showing processing of step S105 shown in FIG. 14.

The processing shown in FIGS. 24 and 26 allows the personal computer 11 to determine the uplink speed using packet pairs.

The downlink speed is also determined by similar processing to that shown in FIGS. 24 and 26.

In this way, for example, the personal computer 11 serving as the media IM client #1 determines the bottleneck link speed after it logs in, and the personal computer 12 serving as the media IM client #2 at the other communication party also determines the bottleneck link speed after it logs in, exchanging the bottleneck link speed information with each other. This allows communication at the optimum speed.

It is to be understood that the bottleneck link speeds may be determined before login. What is essential is to measure the traffic status at substantially the same timing as in actual communication.

The application platform provides implementation of a new protocol architecture that allows negotiation of profiles at the application level based on the presence function, messaging function, and Info/Query function of instant messaging, as well as the transmission speed measurement function. With the use of such a match-making mechanism of the application platform, therefore, applications installed in various devices having different (or the same, of course) capabilities, such as a personal computer and a mobile device, are able to readily and reliably connect to each other. The transmission speeds of bottleneck links for such various devices having different capabilities are also determined, and the optimum transmission speed is therefore determined. Thus, a system capable of transmitting rich media information, including various information such as text, audio, music, moving pictures, and still images, by peer-to-peer communication can be realized. In this case, applications (service entities) for which connectivity is finally authorized are allowed to communicate with each other by peer-to-peer. Information transmission with consideration of the transmission rate is also achievable. Therefore, users are able to readily and reliably exchange information without any special operation.

The processing described above may be executed by hardware in the case of network-enabled CE equipment or the like. It is to be understood that the processing may be executed by software.

When the series of processes is to be executed by software, programs constituting the software are installed from a network or a recording medium onto a computer incorporated in special hardware, for example, a general-purpose personal computer or the like that is capable of achieving various functions with various programs installed thereon.

The recording medium may be a packaged medium carrying the programs, offered to a user for distributing programs separately from a main unit of the apparatus, such as, as shown in FIG. 12, the magnetic disk 141 (including a floppy disk), the optical disk 142 (including a CD-ROM (Compact Disk-Read Only Memory) and a DVD (Digital Versatile Disk)), the magneto-optical disk 143 (including an MD (Mini-Disk)), or the semiconductor memory 144. Alternatively, the recording medium may be the ROM 122, a hard disk included in the storage unit 128, or the like, carrying the programs, which is offered to a user as incorporated in advance in the main unit of the apparatus.

In this document, steps defining the programs recorded on the recording medium may include processing executed sequentially in the orders described, and may also include processing executed in parallel or individually, not necessarily sequentially.

In this document, the term system refers to the overall apparatus constituted of a plurality of devices.

INDUSTRIAL APPLICABILITY

According to the present invention, therefore, information can be exchanged between information processing apparatuses. Particularly, it ensures that various devices connected to transmission paths of various transmission speeds are quickly and readily connected to transmit information without placing a burden on the users. Moreover, even when the traffic status changes depending upon the time zone, reliable information transmission is achievable.

The invention claimed is:

1. An information processing apparatus that communicates with a first other information processing apparatus over a network, said information processing apparatus comprising:
    login means for logging in to a second other information processing apparatus;
    measurement means for measuring a transmission speed of a transmission path between the second other information processing apparatus and the information processing apparatus before or after a login operation is performed via the login means with respect to the second other information processing apparatus;
    notification means for notifying the first other information processing apparatus, via the second other information processing apparatus, of the measured transmission speed; and
    communication means for communicating with the first other information processing apparatus at a transmission speed set based on the transmission speed measured by said measurement means.

2. An information processing apparatus according to claim 1, further comprising:
    receiving means for receiving a transmission speed measured by the first other information processing apparatus via the second other information processing apparatus; and
    setting means for setting the transmission speed at which said information processing apparatus communicates with the first other information processing apparatus based on the transmission speed received by said receiving means and the transmission speed measured by said measurement means.

3. An information processing apparatus according to claim 1, wherein said measurement means measures the transmission speed using a measurement server connected to the network.

4. An information processing method for an information processing apparatus that communicates with a first other information processing apparatus over a network, said information processing method comprising:
    logging in to a second other information processing apparatus;
    measuring a transmission speed of a transmission path between the second other information processing apparatus and the information processing apparatus before or after a login operation is performed via the login means with respect to the second other information processing apparatus;
    notifying the first other information processing apparatus, via the second other information processing apparatus, of the measured transmission speed; and
    communicating with the first other information processing apparatus at a transmission speed set based on the measured transmission speed.

5. A computer-readable medium storing computer-readable instructions for communicating between an information processing apparatus and a first other information processing apparatus over a network, the computer-readable instructions causing a computer to perform the method comprising:
    logging in to a second other information processing apparatus;
    measuring a transmission speed of a transmission path between the second other information processing apparatus and the information processing apparatus before or after a login operation is performed via the login means with respect to the second other information processing apparatus;
    notifying the first other information processing apparatus, via the second other information processing apparatus, of the measured transmission speed; and
    communicating with the first other information processing apparatus at a transmission speed set based on the measured transmission speed.

* * * * *